US012409465B2

(12) United States Patent
Ebertowski et al.

(10) Patent No.: US 12,409,465 B2
(45) Date of Patent: Sep. 9, 2025

(54) LIQUID SPRAY GUN, CONNECTOR RING, LIQUID SPRAYING APPARATUS AND ADAPTER SYSTEM

(71) Applicant: 3M INNOVATIVE PROPERTIES COMPANY, St. Paul, MN (US)

(72) Inventors: Alexander T. Ebertowski, St. Paul, MN (US); Stephen C. P. Joseph, Woodbury, MN (US); Scott D. Gullicks, River Falls, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 301 days.

(21) Appl. No.: 17/299,707

(22) PCT Filed: Dec. 5, 2019

(86) PCT No.: PCT/IB2019/060498
§ 371 (c)(1),
(2) Date: Jun. 3, 2021

(87) PCT Pub. No.: WO2020/121137
PCT Pub. Date: Jun. 18, 2020

(65) Prior Publication Data

US 2022/0055047 A1 Feb. 24, 2022

Related U.S. Application Data

(60) Provisional application No. 62/778,625, filed on Dec. 12, 2018.

(51) Int. Cl.
*B05B 7/24* (2006.01)

(52) U.S. Cl.
CPC .......... *B05B 7/2408* (2013.01); *B05B 7/2478* (2013.01)

(58) Field of Classification Search
CPC ............................ B05B 7/2408; B05B 7/2478
(Continued)

(56) References Cited

U.S. PATENT DOCUMENTS 3,157,360 A 11/1964 Heard
7,036,752 B1 * 5/2006 Hsiang .................. B05B 7/2408 239/290
(Continued)

FOREIGN PATENT DOCUMENTS

EP 2078564 7/2009
WO WO 1998-032539 7/1998
(Continued)

OTHER PUBLICATIONS

International Search Report for PCT International Application No. PCT/IB2019/060498, mailed on Mar. 11, 2020, 5 pages.

*Primary Examiner* — Chee-Chong Lee

(57) ABSTRACT

The invention provides a liquid spray gun connectable to a fluid reservoir through a fluid outlet. The spray gun comprises a socket geometry arranged for engagement with a co-operating connector for releasable connecting the spray gun with the fluid outlet. The socket geometry comprises a bore having an opening on one end, an end surface surrounding the bore's opening at least partially, and a lug portion spaced apart from the end surface in an axial direction parallel to a central axis of the bore. The lug portion has a lower surface being adapted to engage with the connector and to retain the connector in the axial direction. The end surface comprises a first keying geometry that is adapted to restrict rotation of the connector in at least one direction.

17 Claims, 17 Drawing Sheets

(58) Field of Classification Search
USPC .......................................................... 239/345
See application file for complete search history.

(56) References Cited

U.S. PATENT DOCUMENTS

| | | | | |
|---|---|---|---|---|
| 7,083,119 | B2 * | 8/2006 | Bouic | B05B 7/2408 285/361 |
| 7,090,148 | B2 * | 8/2006 | Petrie | B05B 15/40 239/600 |
| 7,165,732 | B2 * | 1/2007 | Kosmyna | B05B 7/2478 285/361 |
| 7,374,111 | B2 * | 5/2008 | Joseph | B05B 7/247 141/2 |
| 7,614,571 | B2 | 11/2009 | Camilleri | |
| 7,789,324 | B2 | 9/2010 | Bouic | |
| 7,823,806 | B2 | 11/2010 | Schmon | |
| 2017/0239681 | A1 * | 8/2017 | Bierie | B05B 7/2408 |

FOREIGN PATENT DOCUMENTS

| | | |
|---|---|---|
| WO | WO 2001-012337 | 2/2001 |
| WO | WO 2004-094072 | 11/2004 |
| WO | WO 2005-068220 | 7/2005 |
| WO | WO 2006-098623 | 9/2006 |
| WO | WO 2018-104826 | 6/2018 |

* cited by examiner

LIQUID SPRAY GUN, CONNECTOR RING, LIQUID SPRAYING APPARATUS AND ADAPTER SYSTEM

CROSS REFERENCE TO RELATED APPLICATIONS

This application is a national stage filing under 35 U.S.C. 371 of PCT/IB2019/060498, filed Dec. 5, 2019, which claims the benefit of U.S. Application No. 62/778,625, filed Dec. 12, 2018, the disclosure of which is incorporated by reference in its/their entirety herein.

FIELD OF THE INVENTION

The present invention relates to a liquid spray gun and a connector ring. In addition, the present invention relates to a liquid spraying apparatus comprising the liquid spray gun and a connector, e.g. said connector ring. Moreover, the present invention relates to an adapter system comprising the connector ring and a corresponding adapter.

BACKGROUND

In the prior art most handheld spray guns comprise a threaded inlet in order to attach the traditional fluid reservoir or paint cup. With the introduction of disposable paint cup systems such as the 3M PPS™, DeVilbiss DeKUPS®, Norton's Paint Cup System and similar products, an adapter (usually CNC machined metal) is provided that converts the threaded inlet of the spray gun to a different connection geometry.

In the case of the SATAjet® 5000 B RP spray gun (equipped with Sata QCC connection), the fluid inlet is non-threaded. In this example, a "screw wedge" geometry which locates and "wedges" under a lug portion (protrusion), itself being integral to the body or socket of the spray gun, is incorporated into the fluid outlet of the lid to facilitate connection.

In US 2017/0239681 A1 a conversion sleeve is described to provide a means for attaching a threaded adapter to a non-threaded fluid inlet. However, the conversion sleeve does not sit flush with the lug portion provided at the socket of the spray gun.

In EP 2 078 564 A1 a tubular coupling member is described that can be push fitted into a non-threaded spray gun inlet. A cutout portion inhibits rotation of the body portion of the insert in the spray gun socket. A threaded adapter can be screwed in accordingly. However, said tubular coupling member does not comprise a mechanical retention that prevents the tubular coupling member from being pulled out of the spray gun socket.

In EP 2 027 931 A1 a stop element is described that is arranged a distance from the upper end of the screw wedge element in the circumferential direction. However, the stop element is made of plastic as it is part of the lid that is made of plastic. Should the lid be over rotated during assembly, the stop element may deform, distort or even be destroyed by the application of excessive force. The stop element does therefore not provide a robust stop for the lid during connection of the lid to the socket of the spray gun.

SUMMARY

It is an object of the present invention to simplify and improve the prior art connection systems. In particular, one object of the present invention is to provide simplified and improved restriction of rotation of the connector in at least one direction. The object is achieved by the features of the independent claims. Dependent claims relate to further embodiments of the present invention.

According to a first aspect the present invention provides a liquid spray gun connectable to a fluid reservoir through a fluid outlet. The spray gun comprises a socket geometry arranged for engagement with a co-operating connector for releasable connecting the spray gun with the fluid outlet. The socket geometry comprises a bore having an opening on one end, an end surface surrounding the bore's opening at least partially, and a lug portion spaced apart from the end surface in an axial direction parallel to a central axis of the bore. The lug portion has a lower surface being adapted to engage with the connector and to retain the connector in the axial direction and the end surface comprises a first keying geometry that is adapted to restrict rotation of the connector in at least one direction.

Thus, due to the provision of a first keying geometry on the socket geometry of the spray gun, different connectors may be easily attached to the spray gun with improved stability and rotational restriction in at least one direction.

The fluid outlet may be an outlet of a reservoir for mixing of paint directly therein.

The reservoir may further comprise a re-usable outer cup and collar. A disposable liner may be provided in the outer cup in order to mix paint therein.

The disposable liner may be closed with a disposable filter lid.

Such systems are disclosed, for example, in applicant's WO 98/32539 A1 (which is incorporated by reference herein in its entirety). Alternatively, other types of liners for spray gun reservoirs are known, for example, from U.S. Pat. No. 3,157,360.

One example of a reservoir is the PPS™ system by 3M Company (Maplewood, Minnesota, U.S.).

Alternatively, the reservoir may comprise a cup that is usually injection molded, does not collapse as the paint is dispensed from the gun, and may thus be provided with a vent. One example is the RPS™ system sold by SATA (Kornwestheim, Germany).

Such vented disposable cups for preparing, applying and preserving paint are known from, for example, U.S. Pat. No. 7,614,571 (which is incorporated by reference herein in its entirety).

Further non-collapsible cups are known from, for example, WO 2005/068220 A1, WO 2006/098623 A1, and applicant's WO 98/32539 A1 (all of which are incorporated by reference herein in their entirety).

The end surface of the socket geometry may be planar.

The connector may be the lid of the reservoir. For example, the lid may comprise a respective second keying geometry to releasable connect the spray gun with the fluid outlet and to restrict rotation of the lid in at least one direction. For example, such a lid may be a lid used in the RPS™ system sold by SATA (Kornwestheim, Germany). Such a lid is known from EP 2 027 931 A1, for example. As outlined above, such a lid may comprise a screw wedge structure, which may be defined as a second keying geometry as will be further described below.

The lid may be directly connected to the socket geometry of the spray gun without any further adapter necessary.

Alternatively, the connector may be a connector ring as further described below, wherein the connector ring comprises a respective second keying geometry.

The connector ring may be used to enable a connection of a threaded adapter or lid to a non-threaded socket geometry.

However, other conversions from the non-threaded socket geometry are possible using a connector ring in accordance with the present invention, e.g. a bayonet fitting or friction fitting.

The first keying geometry may comprise at least one protrusion and/or at least one recess.

The use of at least one protrusion and/or at least one recess may provide a rotational restriction in both directions, and thus, may provide a more stable fit.

The at least one protrusion and/or at least one recess may be provided on a section of the end surface not directly underneath the lug portion when viewed along an axis parallel to the central axis of the bore.

The at least one protrusion and/or at least one recess may be a single protrusion or recess.

The projection of the center of the lug portion onto the end surface of the socket geometry may be defined as a reference location on the end surface at 0°. In this case, the protrusion or recess may be provided on the end surface at any location between 15° and 345°, preferably between 30° and 330°, more preferably between 45° and 315°.

The protrusion or recess may be located at 30° or 330°, preferably at 45° or 315°, more preferably at 90° or 270°, in accordance to the above definition.

The angular ranges starting from 0° as referred to herein may extend in a clockwise direction along the end surface.

The at least one protrusion and/or at least one recess may be a plurality of protrusions and/or recesses.

The plurality of protrusions and/or recesses may be provided on the end surface at equidistances or irregular distances to one another.

The plurality of protrusions and/or recesses may be provided on the end surface in an area that is located opposite the lug portion.

Taking the above given definition, i.e. that the projection of the center of the lug portion onto the end surface of the socket geometry may be defined as a reference location on the end surface at 0°. In this case, the plurality of protrusions and/or recesses may be provided on the end surface between 15° and 345°, preferably between 30° and 330°, more preferably between 45° and 315°.

The plurality of protrusions and/or recesses may be located at 15°, 180° and/or 345°, preferably at 30°, 180° and/or 330°, more preferably at 45°, 180° and/or 315°, in accordance to the above definition.

If the connector is the aforementioned lid used in the RPS™ system sold by SATA (Kornwestheim, Germany), the first keying geometry may be at least one protrusion. That is, the first keying geometry, i.e. the at least one protrusion, may restrict rotation of the screw wedge located on the outside circumference of the lid by engagement of the leading edge of the screw wedge with the protrusion.

Although the leading edge of the lid of the RPS™ system may be a sloped leading edge, the leading edge may be adjusted to comprise a flat leading edge, thereby providing a more robust end stop, i.e. rotational stop, when engaging with the at least one protrusion on the end surface of the socket geometry.

Nevertheless, other lids than the lid of the RPS™ system may also be used as a connector in connection with the present invention. Thus, for any kind of lid, the first keying geometry may comprise at least one protrusion and/or at least one recess. The respective second keying geometry, similar to the second keying geometry described below in connection with the connector ring, may be provided at the lid to releasable connecting the spray gun with the fluid outlet and to restrict rotation of the lid in at least one direction.

If the connector is a connector ring (as further described below), the first keying geometry may comprise at least one protrusion and/or at least one recess.

The at least one protrusion and/or at least one recess may extend in an axial direction of the bore.

The lug portion may project from the socket geometry towards the central axis of the bore.

The lug portion may project from the socket geometry towards a central axis of the bore about the same distance as the width of the end surface. Thus, not blocking the bore for inserting an adapter or lid.

Preferably a radial inner surface of the lug portion surrounding the bore is at least partially curved when viewed along an axial direction parallel to the central axis of the bore.

Taking the above given definition, i.e. that the projection of the center of the lug portion onto the end surface of the socket geometry may be defined as a reference location on the end surface at 0°. The lug portion may extend within an angular range of 40° in both directions, more preferably 30° in both directions, and even more preferably 20° in both directions, and most preferably 10° in both directions.

The lug portion being spaced apart from the end surface in an axial direction thereof may define a recess between the end surface of the socket geometry and the lower surface of the lug portion.

The lower surface of the lug portion may be a chamfered surface.

The lower surface may be spaced from the end surface by at least 1 mm, preferably at least 2 mm, more preferably at least 3 mm, and even more preferably at least 4 mm.

The end surface may be at least one of the following: wavy shaped, saw-tooth shaped, regular shaped, irregular shaped.

The end surface may comprise a repeating or non-repeating shape.

The end surface may comprise a combination of raised and recessed surfaces.

The above-mentioned shapes of the end surface may define the first keying geometry. That is, the first keying geometry may be defined by the shape of the end surface.

According to a second aspect, the present invention provides a liquid spraying apparatus comprising the spray gun described above and a connector. The connector comprising: a first surface adapted to engage with the lower surface of the lug portion to retain the connector in the axial direction, and a second keying geometry that is adapted to engage with the first keying geometry to restrict rotation of the connector in at least one direction.

The first surface may face away from the end surface, preferably when engaged with the lower surface of the lug portion.

The connector may comprise a connector ring with the second keying geometry.

The first keying geometry comprises preferably the inverse structure of the second keying geometry.

The connector ring may be a C-shaped connector ring having a gap along the circumference of the connector ring and the second keying geometry may be defined by the gap of the C-shaped connector ring.

The C-shape may only be a part of the connector ring and does not exclude other geometric parts that may be comprised in the connector ring as long as the functional geometry is a C-shape. That is, as long as the connector ring comprises a C-shape that defines a second keying geometry to be engaged with a first keying geometry.

The C-shaped part of the connector ring may follow the end surface of the socket geometry.

The second keying geometry may comprise at least one recess or at least one protrusion on a second surface of the connector ring facing towards the end surface of the socket geometry.

Both the C-shape and the at least one recess or at least one protrusion may provide a rotational stop for the connector ring in two directions.

The connector ring comprising the C-shape may further comprise at least one protrusion and/or at least one recess in accordance with the first keying geometry provided on the end surface of the socket geometry to provide a more robust fitting.

The connector ring may comprise a threaded internal surface.

Alternatively, the connector ring may comprise a bayonet fitting or a friction fit as long as it is able to provide a way to retain an adapter or a lid in the connector ring and therefore the adapter or the lid in the bore of the socket geometry.

The liquid spraying apparatus may further comprise an adapter with a threaded outer surface to engage with the threaded inner surface of the connector ring.

The adapter may be adapted to be screwed into the connector ring and adapted to abut against the spray gun so that the connector ring is forced against the lower surface of the lug portion as the adapter is screwed into the connector ring so as to provide a fluid-tight connection between the liquid spray gun and the adapter.

Alternatively, in accordance with the connector ring, the adapter may comprise a pin to engage with the bayonet fitting of the connector ring or a corresponding friction fit to retain the adapter in the connector ring and therefore the adapter in the bore of the socket geometry.

The adapter may have a tubular pipe (also referred to as a fluid outlet or fluid conduit) adapted to extend into the bore.

The fluid-tight connection between the liquid spray gun and the adapter may be provided by forcing the tubular pipe against the bore.

A front-end surface of the tubular pipe may be forced against a constriction within the bore.

The front-end surface of the tubular pipe may be chamfered.

The socket geometry of the spray gun may comprise an additional adapter part as a separate part to the socket geometry, wherein the adapter part is connectable to the socket geometry, and wherein the adapter part comprises a bore with an end surface surrounding the bore's opening at least partially and a lug portion spaced apart from the end surface in an axial direction of the bore. The lug portion has a lower surface being adapted to engage with the connector and to retain the connector in the axial direction and the end surface of the socket geometry comprises a first keying geometry that is adapted to restrict rotation of the connector in at least one direction.

In other words, an additional adapter part may be provided to be connectable to the socket geometry of the spray gun, wherein the adapter part comprises the aforementioned lug portion and the first keying geometry in addition or instead of the socket geometry of the spray gun.

According to a third aspect, the present invention provides a connector ring for releasable connecting a liquid spray gun to a fluid outlet for a liquid to be sprayed, wherein the liquid spray gun comprising a socket geometry with a bore having an opening on one end, an end surface surrounding the bore's opening at least partially, and a lug portion spaced apart from the end surface in an axial direction parallel to a central axis of the bore. The connector ring comprises: a first surface adapted to engage with a lower surface of the lug portion to retain the connector ring in the axial direction, and a second keying geometry that is adapted to engage with a first keying geometry of the socket geometry to restrict rotation of the connector ring in at least one direction.

The first surface may face away from the end surface. That is, when engaged with the end surface of the socket geometry, the first surface may be defined as the surface that faces away from the end surface.

The connector ring may be a C-shaped connector ring with a gap along the circumference of the connector ring and wherein the second keying geometry is defined by the gap of the C-shaped connector ring.

The second keying geometry may comprise at least one recess or at least one protrusion on a second surface of the connector ring facing away from the first surface of the connector ring.

The connector ring may comprise a threaded inside surface.

According to a fourth aspect, the present invention provides an adapter system for releasable connecting a liquid spray gun to a fluid outlet for a liquid to be sprayed, wherein the liquid spray gun comprises a socket geometry with a bore having an opening on one end, an end surface surrounding the bore's opening at least partially, and a lug portion spaced apart from the end surface in an axial direction parallel to a central axis of the bore. The adapter system comprising: a connector ring as described above; and an adapter configured to engage with the connector ring.

The connector ring may comprise a threaded inside surface and the adapter may comprise a threaded outer surface to engage with the inside surface of the connector ring.

The adapter may be adapted to be screwed into the connector ring and adapted to abut against the spray gun so that the connector ring is forced against the lower surface of the lug portion as the adapter is screwed into the connector ring so as to provide a fluid-tight connection between the liquid spray gun and the adapter.

The connector ring may alternatively comprise a bayonet fitting or a friction fit, and the adapter may comprise a corresponding pin to engage with the bayonet fitting of the connector ring or a corresponding friction fit to engage with the connector ring and thereby retain the adapter in the connector ring.

Thus, the present invention provides for an improved connection between a spray gun and a fluid outlet for a liquid to be sprayed. Further advantages may be apparent to a person skilled in the art from the description of the present invention herein.

BRIEF DESCRIPTION OF THE DRAWINGS

The present invention is further described with respect to exemplary embodiments by referring to the FIGURES, where.

DETAILED DESCRIPTION

Some preferred embodiments are now described with reference to the drawings. For explanation purpose, various specific details are set forth, without departing from the scope of the present invention as claimed. Like numerals refer to the same features. In addition, the description of features that are described with reference to a certain embodiment is not repeated for the other embodiments. However, the description thereof shall apply to the other embodiments as well.

Figure 1:
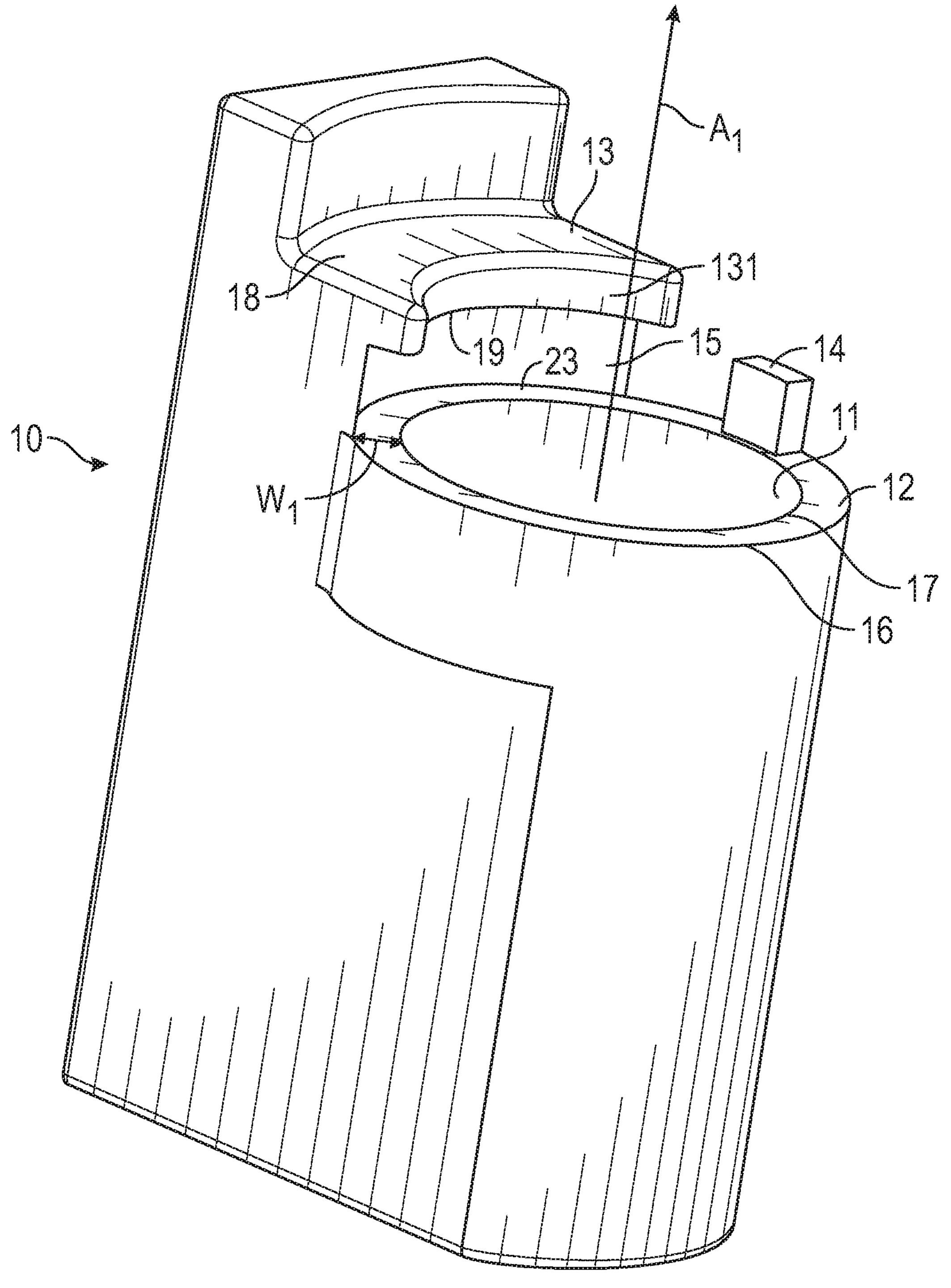
FIG. 1 illustrates a perspective view of a socket geometry of a liquid spray gun according to an embodiment of the present invention.

FIG. 1 shows perspective view of a socket geometry 10 of a liquid spray gun (not shown). In some embodiments, the socket geometry may be integrally formed with the spray gun body. The socket geometry 10 comprises, as shown in FIG. 1, a bore 11, an end surface 12, a lug portion 13, a radial inner surface 131 of the lug portion 13, a protrusion 14 and a connecting surface 15.

The end surface 12 surrounds the bore's opening. It is preferable that the end surface 12 surrounds the bore's opening completely, i.e. the end surface 12 extends completely around the bore's opening. In some embodiments, as illustrated in FIG. 1, the end surface 12 of the socket geometry is planar.

The end surface 12 further comprises the protrusion 14, which is one example for a keying geometry in the sense of the present invention. That is, a keying geometry as used herein, e.g. the protrusion 14, defines a geometry that is configured to be engaged with a corresponding geometry, preferably a complementary negative thereof, e.g. a recess in the case of the protrusion 14. However, as outlined below, the protrusion 14 may also be engaged with a different corresponding structure than a recess, e.g. a leading edge of a lid (as will be described below).

The protrusion 14 extends in an axial direction from the end surface 12. That is, the protrusion 14 extends from the end surface 12 in a direction parallel to central axis, $A_1$, of the bore 11. The protrusion 14 may extend over the whole width, $W_1$, of the end surface 12 or just a part of the end surface 12. In the latter, the protrusion 14 may extend from the outer side 16 of the end surface 12 towards the inner side 17, i.e. the side located at the bore 11, of the end surface 12, but not all the way to the inner side of the end surface 12 to leave some space on the end surface 12 between the protrusion 14 and the inner side of the end surface 12.

The lug portion 13 is spaced apart from the end surface 12 in an axial direction parallel to the central axis $A_1$. The lug portion 13 relates to the part that extends from the main body of the socket geometry 10 towards the center of the bore 11, i.e. towards the central axis, $A_1$, of the bore 11.

The lug portion 13 has a radial inner surface 131 that surrounds the bore 11 partially and is curved when viewed along an axial direction. In some embodiments, the radial inner surface 131 follows the curvature of the end surface 12.

The lug portion 13 and the end surface 12 are connected by the connecting surface 15. The connecting surface 15 extends in an axial direction from the end surface 12 and connects the end surface 12 and the lug portion 13. The above mentioned spacing between the lug portion 13 and the end surface 12 is defined by the extension of the connecting surface 15 in said axial direction from the end surface 12.

The connecting surface 15 is located on the outer side 16 of the end surface 12. The lug portion 13 extends from the connecting surface 15 towards the central axis of the bore 11 about the same length as the width, $W_1$, of the end surface 12.

The connecting surface 15 has the same curvature as the end surface 12 and the radial inner surface 131.

The lug portion 13 comprises an upper surface 18 that faces away from the end surface 12 and a lower surface 19 that faces towards the end surface 12. The lower surface is defined as the extension from the connecting surface 15 to the radial inner surface 131.

The projection of the center of the lug portion 13 onto the end surface 12 of the socket geometry 10 may be defined as a reference location 23 on the end surface 12 at 0°. In this case, the protrusion 14 is located on the end surface 12 at 90° according to FIG. 1, wherein the angular range starting from 0° extends in a clockwise direction along the end surface.

Accordingly, the lug portion 13 extends within an angular range of approximately 40° in both directions, i.e. from 0° to 40° and from 320° to 0°.

Figure 2A:
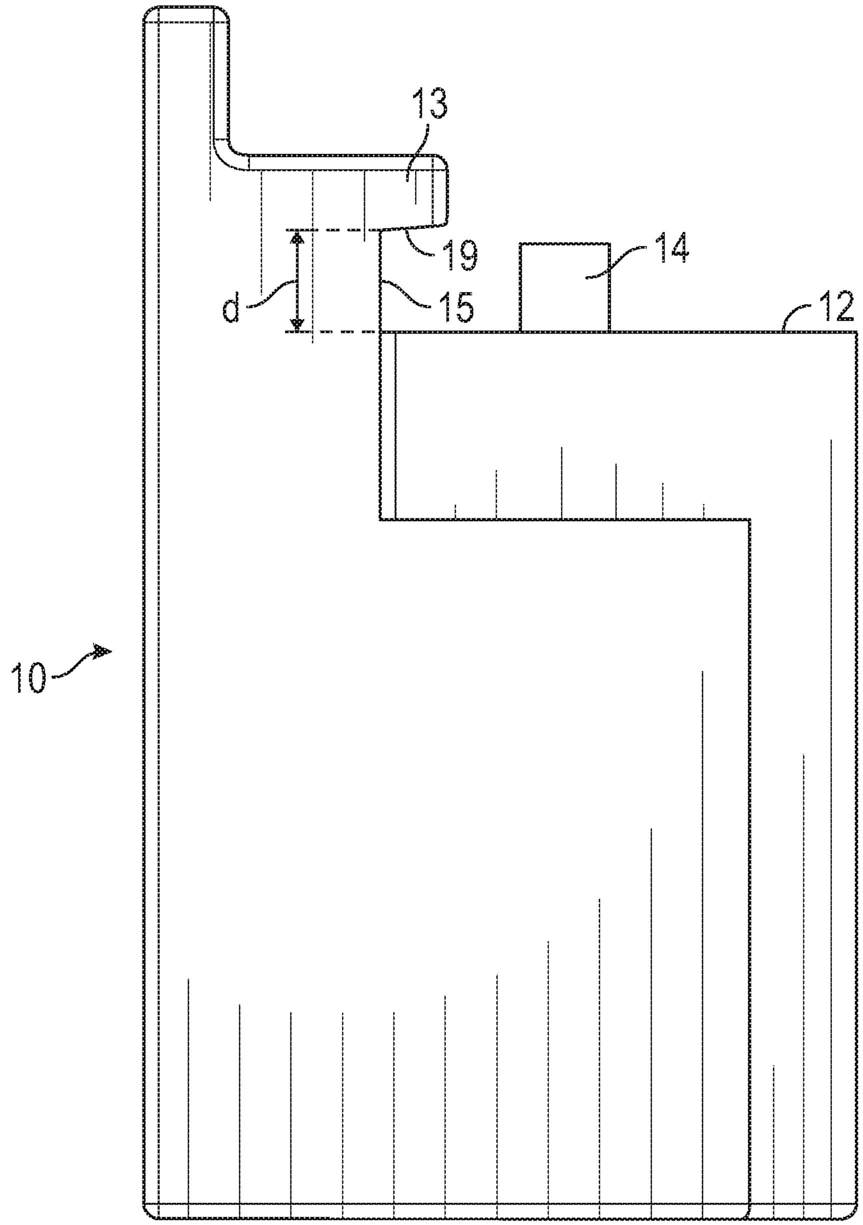
FIG. 2A illustrates a side view of the socket geometry of a liquid spray gun according to FIG. 1.
Figure 2B:
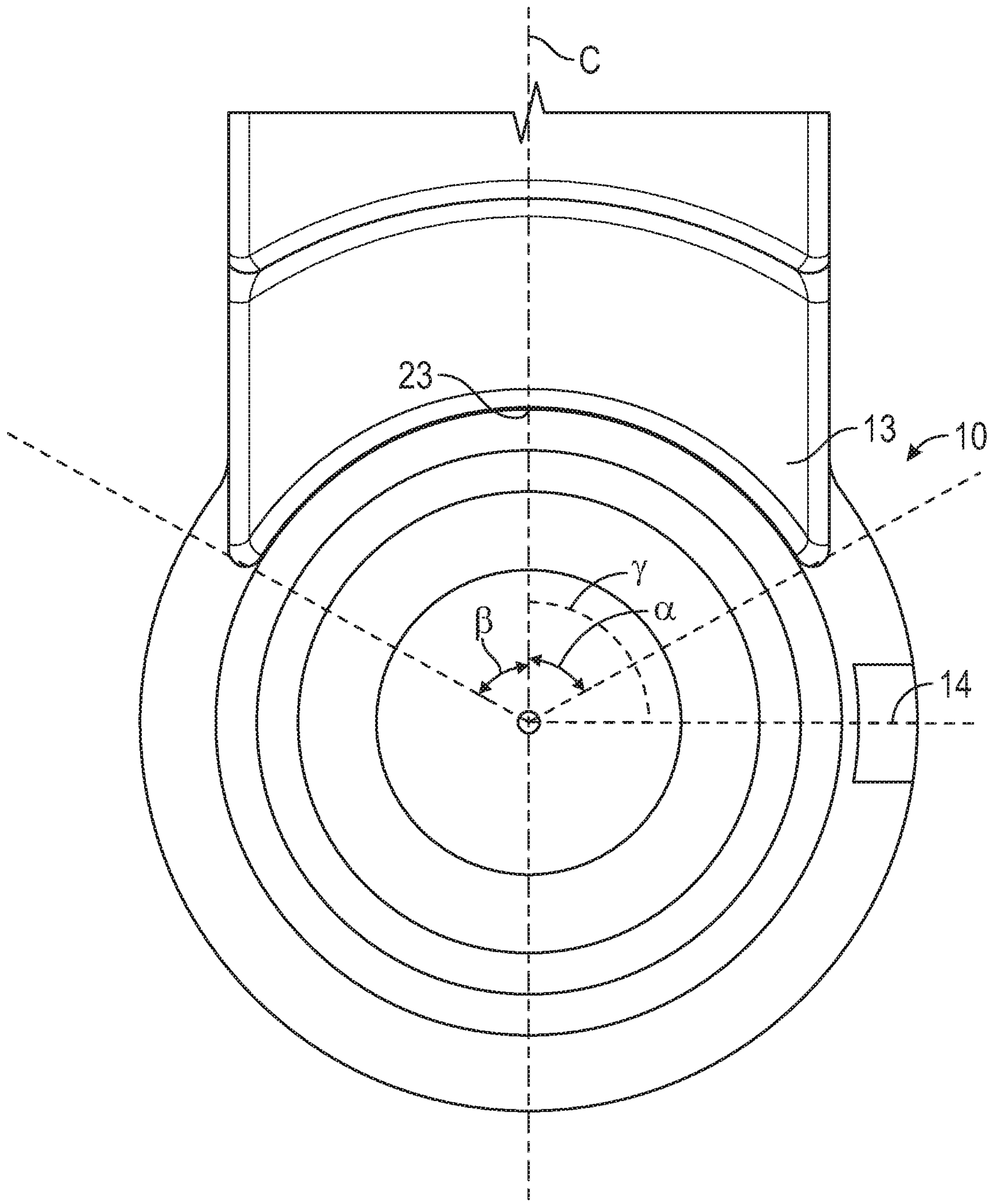
FIG. 2B illustrates a top view of the socket geometry of a liquid spray gun according to FIG. 1.

FIGS. 2A and 2B show a side view and top view, respectively, of the socket geometry 10 of FIG. 1. FIGS. 2A and 2B show the end surface 12, the lug portion 13, the protrusion 14 and the connecting surface 15. In addition, the extension of the connecting surface 15 is indicated by d.

That is, the connecting surface 15 extends in an axial direction from the end surface 12 to the lower surface of the lug portion 13 by the parameter d.

FIG. 2B also illustrates the center line c that is defined by the center of the lug portion 13 and the center of the bore's opening. The center line c may be used to define the angular relations described herein. As defined above, the projection of the center of the lug portion 13 onto the end surface 12 of the socket geometry 10 may be defined as a reference location 23 on the end surface 12 at 0°. Therefore, the angles α and β indicated in FIG. 2B define the above mentioned angular range that the lug portion 13 extends in both directions from the indicated center line c. In addition, the angle γ indicated in FIG. 2B defines the above-mentioned location of the protrusion 14 on the end surface 12. This illustrative concept applies to all angles and angular ranges defined herein.

Figure 3:
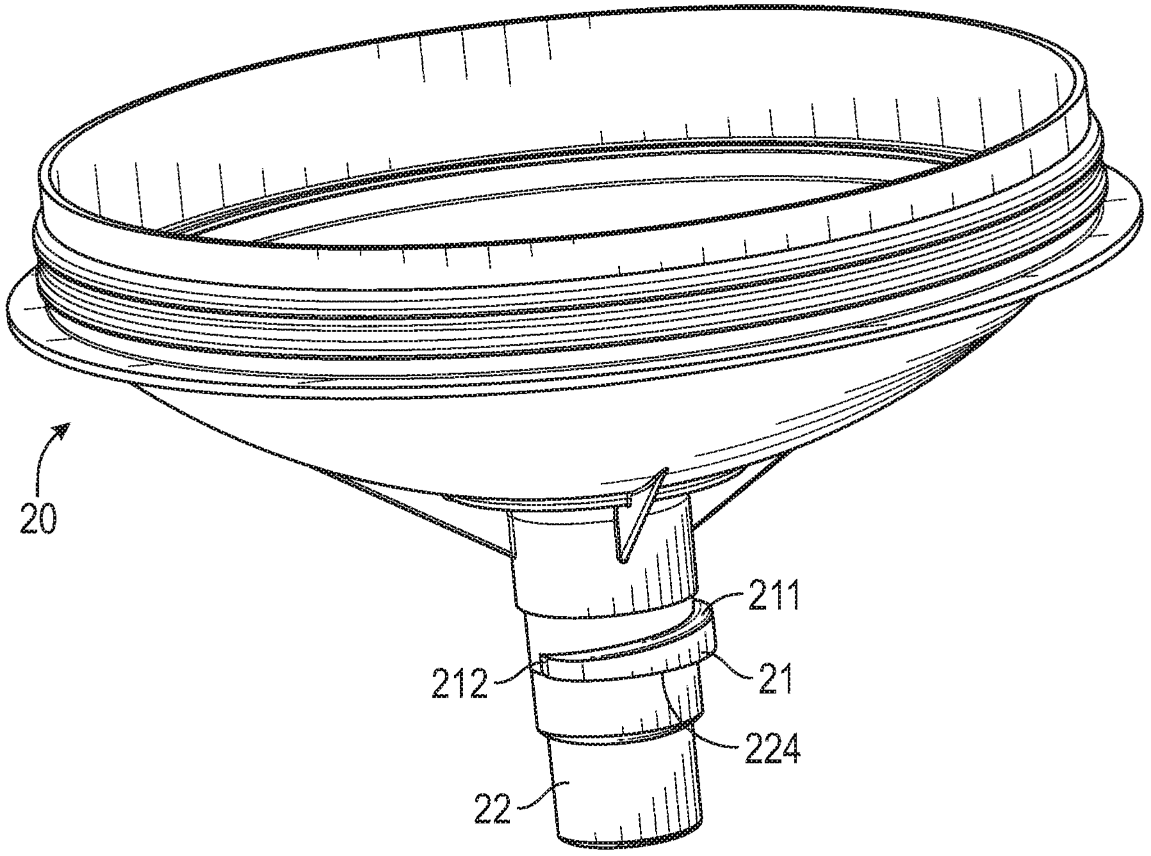
FIG. 3 illustrates a perspective view of a lid according to an embodiment of the present invention.

FIG. 3 shows a perspective view of a lid 20. The lid 20 may also be generally referred to as a connector. The lid 20, as shown in FIG. 3, comprises a fluid outlet having a "screw wedge" geometry 21 with an upper surface 211, a lower surface 224, and a leading edge 212.

The fluid outlet 22 is to be inserted into the bore 11 of the socket geometry 10 as descried with reference to FIGS. 1 and 2.

The screw wedge geometry 21 protrudes from the outer surface of the fluid outlet 22 extending partially around the circumference of the fluid outlet 22. The screw wedge geometry 21 has a chamfered upper surface 211 and a leading edge 212 at the front part, i.e. the thin part, of the screw wedge geometry 21.

The lid may be a lid of the RPS' system sold by SATA (Kornwestheim, Germany). Such a lid is known from EP 2 027 931 A1, for example.

Figure 4:
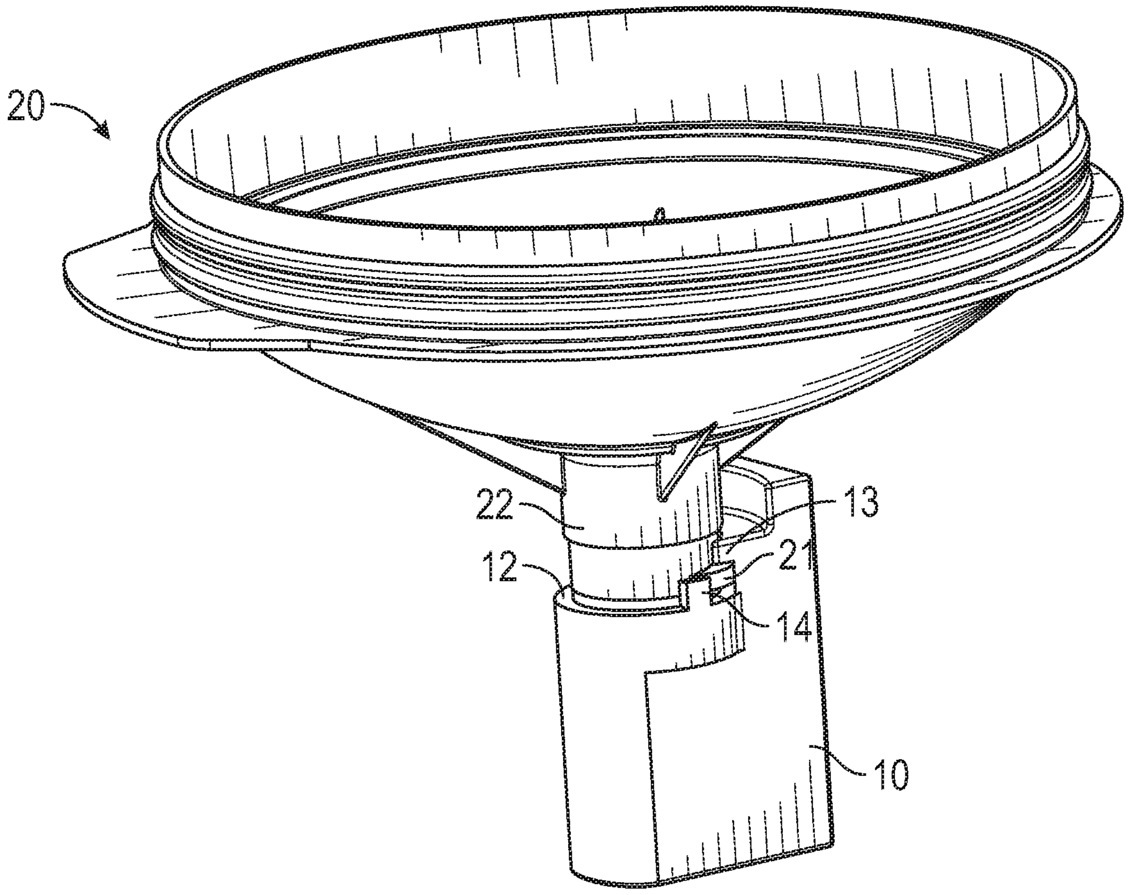
FIG. 4 illustrates a perspective view of the socket geometry of a liquid spray gun according to FIG. 1 connected to the lid of FIG. 3.

FIG. 4 shows a perspective view of a connection between the socket geometry 10 as described with reference to FIGS. 1 and 2 and the lid 20 as described with reference to FIG. 3. As can be seen from FIG. 4, the screw wedge geometry 21 is inserted between the end surface 12 and the lug portion 13. This may be achieved by inserting the leading edge 212 in the opening between the lug portion 13 and the end surface 12 from the side, where the protrusion 14 is not located. By a screwing, turning or twisting motion, the upper surface 211 of the screw wedge geometry 21 is engaged with the lower surface of the lug portion 13 and the lower surface of the screw wedge geometry 21 is engaged with the end surface 12 of the socket geometry 10. Thereby the lid 20 or rather the fluid outlet 22 of the lid 20 is retained within the socket geometry's bore 11 by the screw wedge geometry 21 being screwed in between the lug portion 13 and the end surface 12. Thus, the lug portion 13 and the end surface 12 retain the lid 20 in an axial direction thereof.

In addition, the leading edge 212 of the screw wedge geometry 21 is engaged with, interferes with or abuts against the protrusion 14, thereby preventing a further rotational movement of the lid 20 in the screwing direction. Thus, the protrusion 14 provides a rotational stop for the lid 20 by engaging with the leading edge 212 of the screw wedge geometry 21.

The leading edge 212 of the screw wedge geometry 21 may be chamfered or straight. By providing the leading edge 212 as a straight edge, a more robust rotational stop may be achieved when engaging with a corresponding straight surface, i.e. a side surface, of the protrusion 14.

Figure 5:
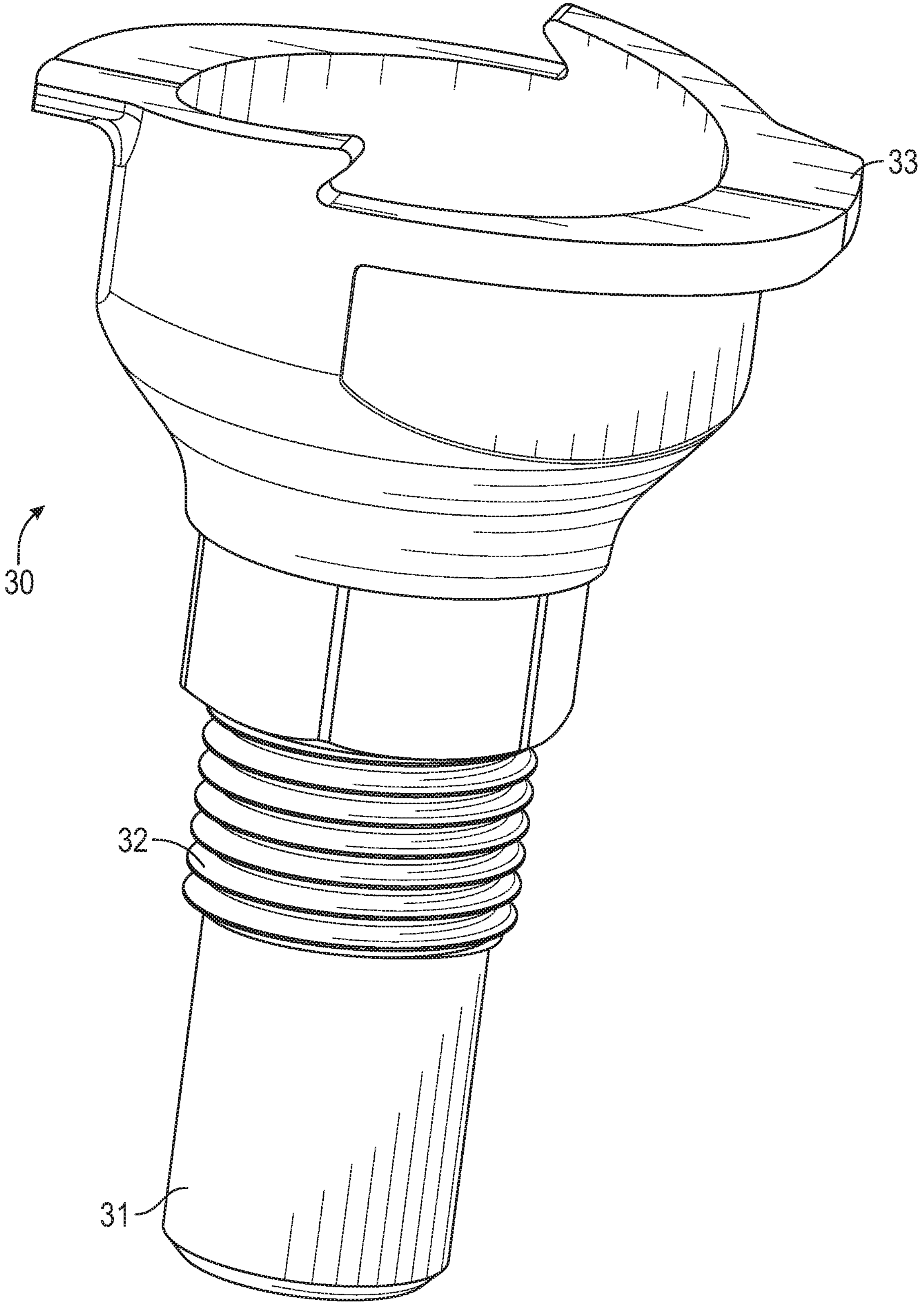
FIG. 5 illustrates a perspective view of an adapter according to an embodiment of the present invention.

FIG. 5 shows a perspective view of an adapter 30. The adapter 30 comprises, as can be seen in FIG. 5, a fluid outlet 31 and a threaded outer surface 32 protruding from the outer surface of the fluid outlet 31, i.e. in an axial direction of the fluid outlet 31. The adapter 30 further comprises a connecting geometry 33 configured to connect to a fluid outlet of a reservoir (not shown) for mixing paint. The function of the adapter 30 will be further described below with reference to FIG. 7.

Figure 6A:
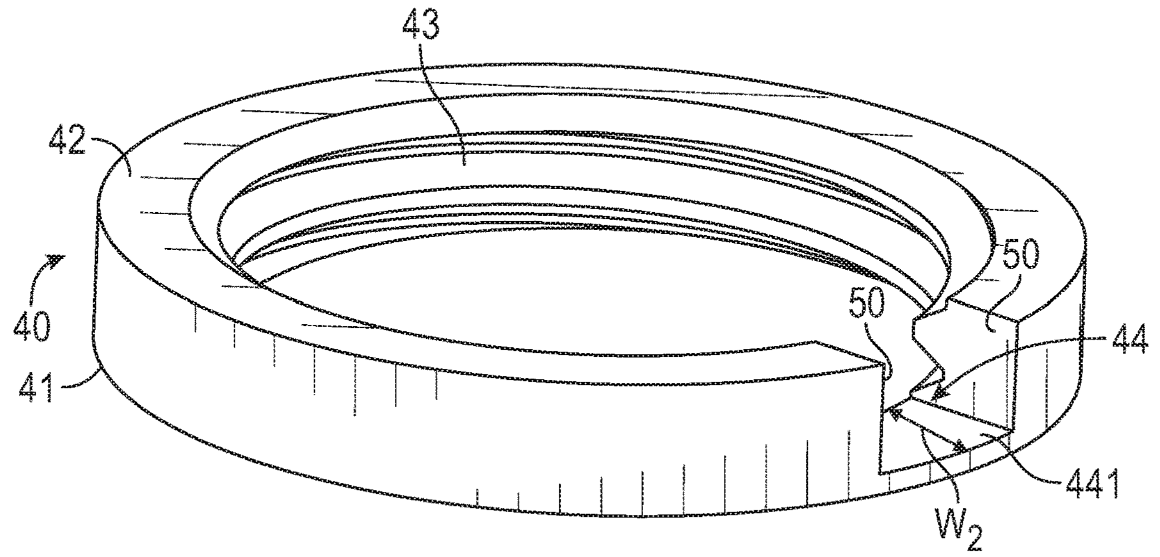
FIG. 6A illustrates a perspective view of a connector ring according an embodiment of the present invention.
Figure 6B:
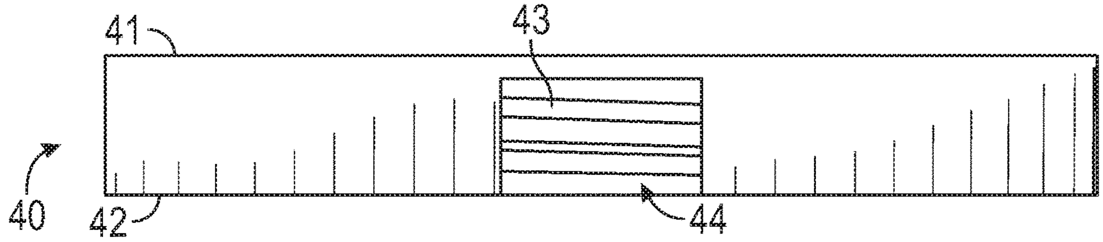
FIG. 6B illustrates a side view of the connector ring of FIG. 6A.

FIGS. 6A and 6B show a perspective view and side view, respectively, of a connector ring 40. The connector ring 40 comprises, as can be seen in FIG. 6A, a first surface 41, a second surface 42, an internal surface 43, a recess 44 and a bridge portion 441.

The connector ring 40 may also be referred to generally as a connector. In particular, the connector ring 40 as well as the lid 20 described above may be referred to as connectors, because both serve the purpose to connect a reservoir to the socket geometry 10 of the spray gun either directly or by use of additional components, e.g. an adapter 30 as described above.

The first surface 41 may referred to as a top surface and the second surface 42 may be referred to as a lower surface of the connector ring 40. The first and second surfaces 41, 42 surround the opening of the connector ring 40. The first and second surfaces 41, 42 lie in planes that are parallel to each other.

The internal surface 43 connects the first surface 41 and the second surface 42. The internal surface 43 may be threaded, as shown in FIG. 6A, to receive, for example, a corresponding threaded adapter 30 as described with reference to FIG. 5. In this case, the internal surface 43 may also be referred to as a threaded internal surface 43.

The recess 44 is defined by cutting out a part of the connector ring 40 from the side of the second surface 42, leaving the bridge portion 441 on the first surface 41. That is, the recess 44 is a cutout from the side of the second surface 42, wherein a bridge portion 441 of a predetermined width, $W_2$, is defined by end surfaces 50 of the recess 44 and the first surface 41 of the connector ring 40.

As will be evident from the description below with reference to FIG. 7, the recess 44 is configured to engage with the protrusion 14 of the socket geometry 10 as described with reference to FIG. 1 and the threaded internal surface 43 of the connector ring 40 is configured to engage with the threaded outer surface 32 of the adapter 30 as described with reference to FIG. 5.

However, it is clear that the threaded internal surface 43 of the connector ring 40 according to the present invention is not restricted to engage with an adapter 30. The threaded internal surface 43 of the connector ring 40 can engage with any corresponding threaded connector between a socket geometry 10 and a fluid outlet of a reservoir for mixing paint. For example, the corresponding threaded surface may be comprised on a lid, which connects to a respective reservoir, thus, allowing for a connection between the socket geometry 10 and the reservoir without the use of an adapter 30.

Figure 6C:
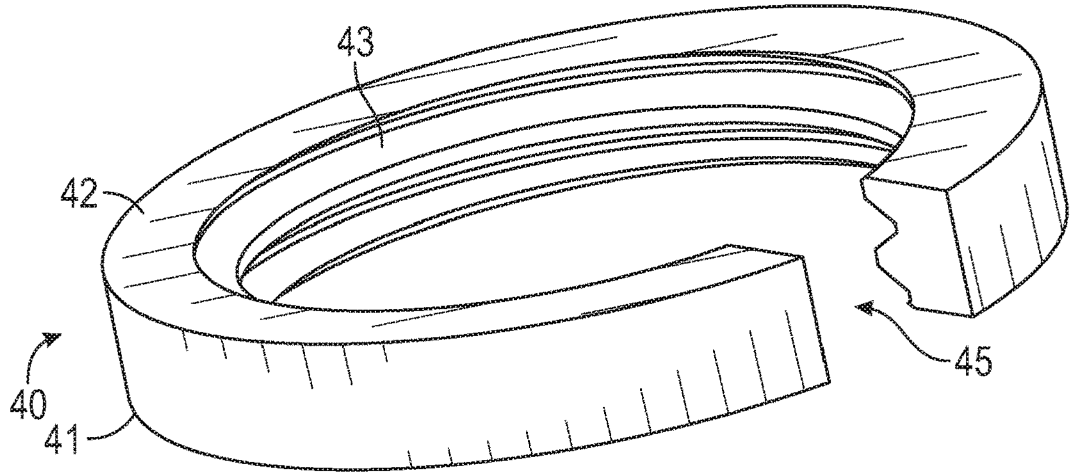
FIG. 6C illustrates a perspective view of a connector ring according an embodiment of the present invention.

FIG. 6C shows a perspective view of a connector ring 40 that comprises a C-shape with a gap (or cutout) 45 along the circumference of the connector ring 40 and where the second keying geometry is defined by the gap 45 of the C-shaped connector ring 40.

In other words, the connector ring 40 of FIGS. 6A and 6B is modified in that the bridge portion 441 is omitted or cut out, and thus, defining the gap 45 in the connector ring 40.

Figure 7:
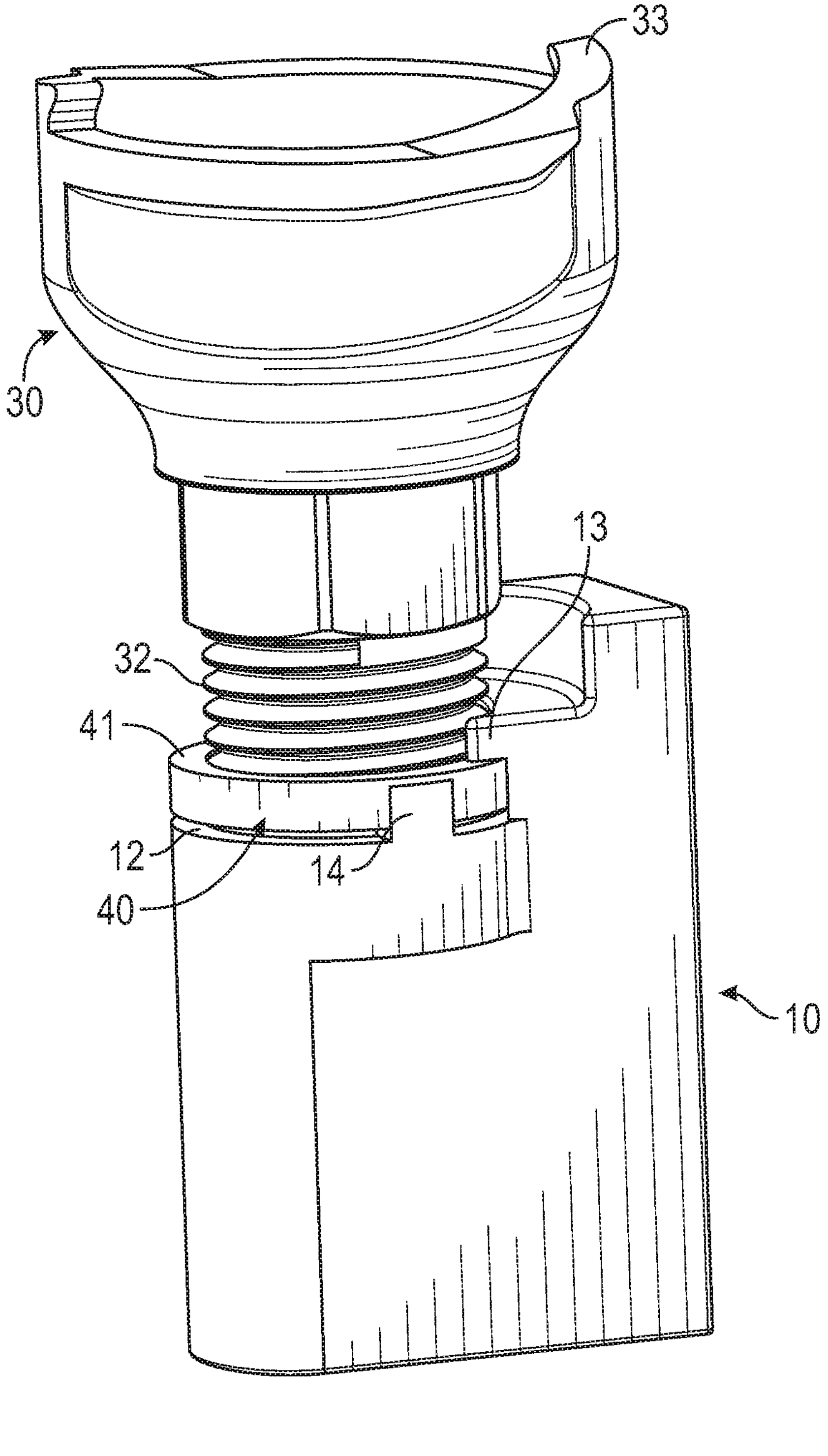
FIG. 7 illustrates a perspective view of the socket geometry of FIG. 1, the adapter of FIG. 5 and the connector ring of FIG. 6A assembled together.

FIG. 7 shows a perspective view of a connection between the socket geometry 10 as described with reference to FIGS.

1 and 2, the adapter 30 as described with reference to FIG. 5 and the connector ring 40 as described with reference to FIGS. 6A and 6B.

First, the connector ring 40 is engaged with the socket geometry 10 such that the second surface 42 faces the end surface 12 of the socket geometry 10 and the first surface 41 faces the lower surface of the lug portion 13 of the socket geometry 10. That is, the connector ring 40 is located at least in part between the lug portion 13 and the end surface 12 of the socket geometry 10. In addition, the protrusion 14 of the socket geometry 10 is engaged with the recess of the connector ring 40, thereby preventing rotation of the connector ring 40.

Second, the adapter 30 is screwed into the connector ring 40, i.e. the threaded internal surface 43 of the connector ring 40 is engaged with the threaded outer surface 32 of the adapter 30 and a rotational motion is thereby converted into a downward motion. Thus, the adapter 30 or rather the fluid outlet 31 of the adapter 30 is being moved into the bore 11 of the socket geometry 10. As soon as the lower surface of the fluid outlet 31 comes in contact with a bottom surface of the bore 11, the first surface 41 of connector ring 40 is forced against the lower surface of the lug portion 13 by the rotation of the adapter 30. Thereby, the adapter 30 is secured in the socket geometry 10.

Figure 8:
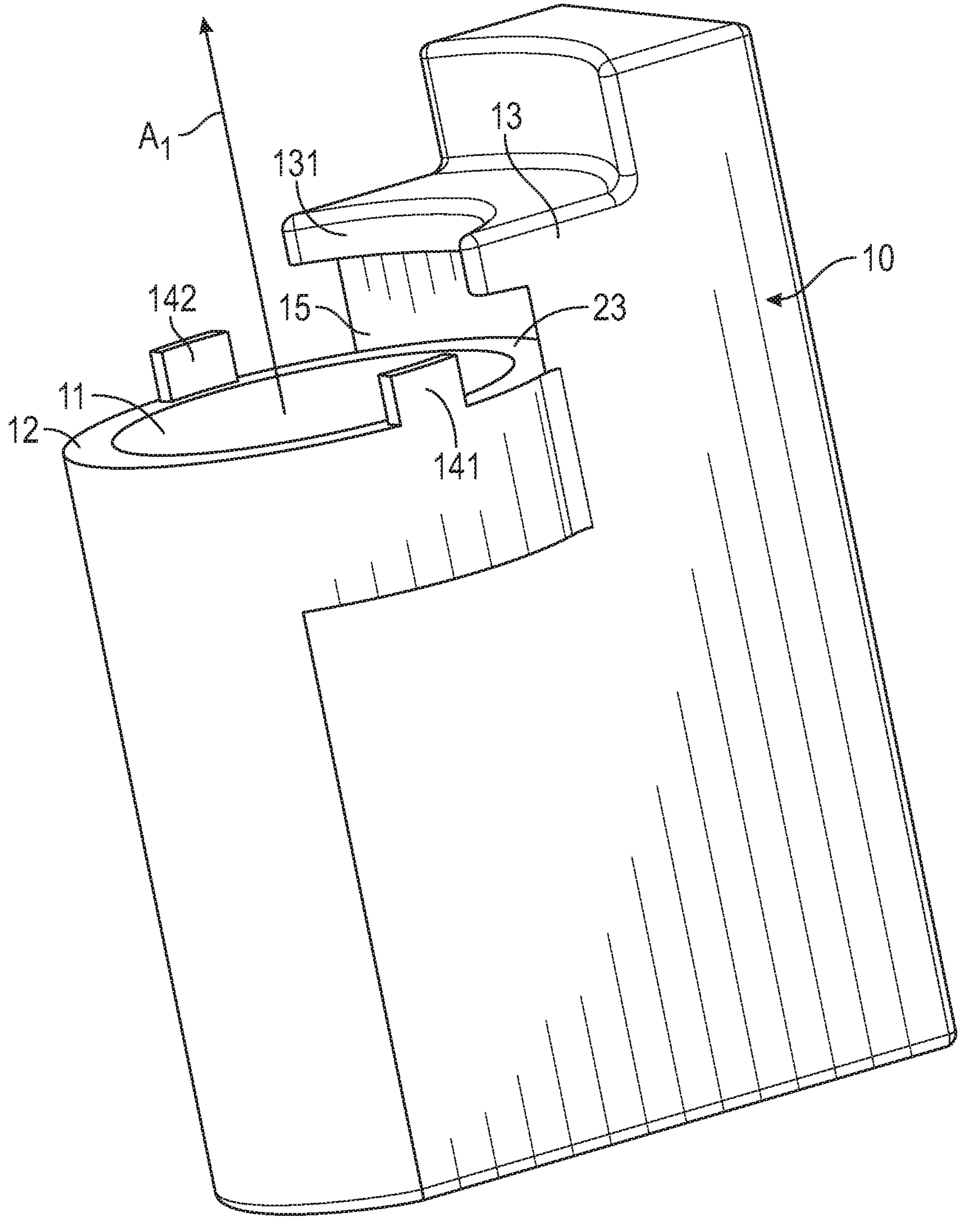
FIG. 8 illustrates a perspective view of a socket geometry of a liquid spray gun according to an embodiment of the present invention.

FIG. 8 shows perspective view of a socket geometry 10 of a liquid spray gun (not shown) according to another embodiment. In particular, the socket geometry 10 according to FIG. 8 differs from the socket geometry 10 according to FIG. 1 in that two protrusions 141, 142 are provided at opposite sides of the end surface 12 of the socket geometry 10.

Again, the projection of the center of the lug portion 13 onto the end surface 12 of the socket geometry 10 as a reference location 23 on the end surface 12 may be defined as 0°, wherein the angular range starting from 0° extends in a clockwise direction along the end surface. In this case, the first protrusion 141 is located on the end surface 12 at 90° and the second protrusion 142 is located on the end surface 12 at 270° according to FIG. 8. That is, the first protrusion 141 is located relative to the second protrusion 142 by 180° on the end surface 12.

Figure 9A:
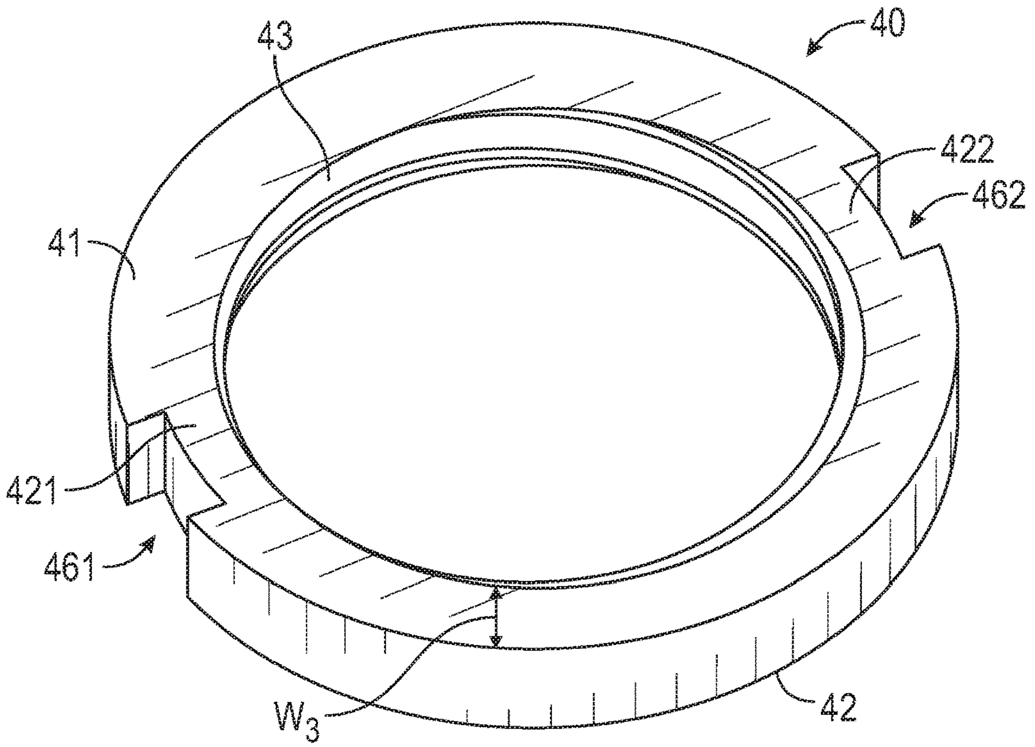
FIG. 9A illustrates a perspective view of a connector ring according an embodiment of the present invention.
Figure 9B:
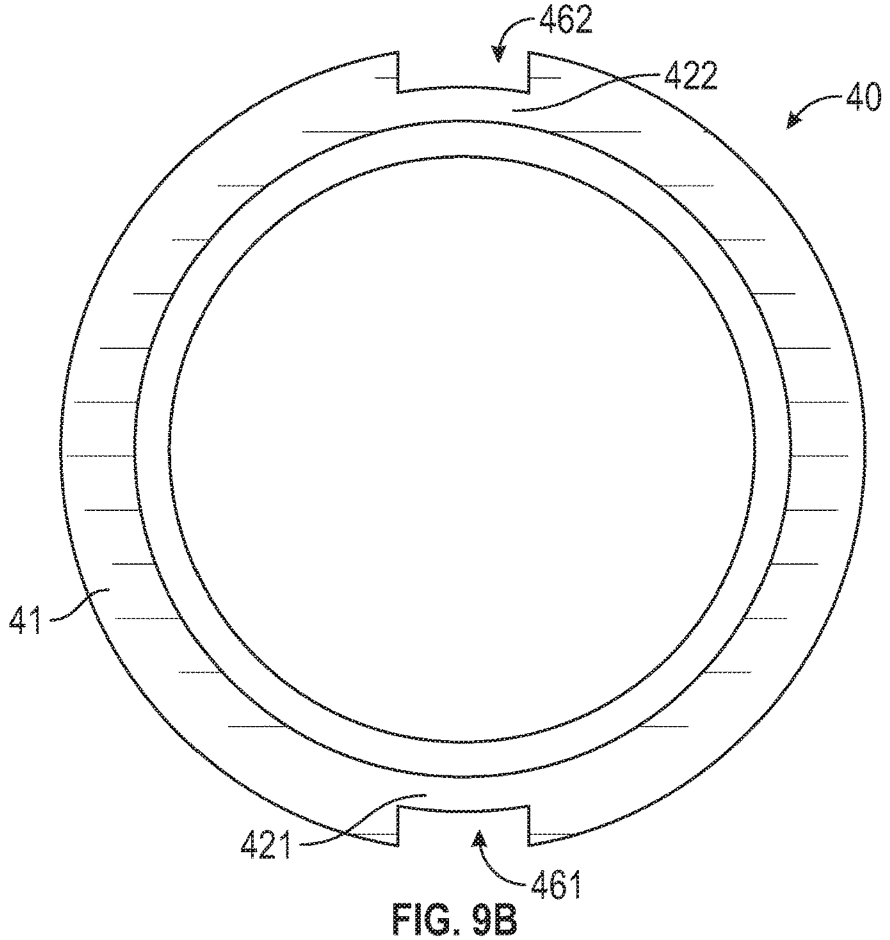
FIG. 9B illustrates a top view of the connector ring of FIG. 9A.

FIGS. 9A and 9B show a perspective view and a top view, respectively, of a connector ring 40 in accordance with the socket geometry 10 of FIG. 8. That is, the connector ring 40 of FIGS. 9A and 9B are configured to engage with the socket geometry 10 of FIG. 8 comprising two protrusions 141, 142. Therefore, the connector ring 40 of FIGS. 9A and 9B comprises two recesses 461, 462 at opposite sides of the connector ring 40. That is, according to the above definition of the angular range, the first recess 461 is located relative to the second recess 462 by 180° on the first surface 41.

In addition, the recesses 461, 462 differ from the recess 44 shown in FIGS. 6A and 6B in that the recesses 461, 462 are defined as cutouts from the first and the second surface 41, 42, thus, leaving respective bridge portions 421, 422, which comprise the first and the second surfaces 41, 42. In contrast, the bridge portion 441 described with reference to FIG. 6A comprises only the first surface 41.

In other words, the recesses 461, 462 are cutouts that reduce the width, $W_3$, of the connector ring 40 at the recesses 461, 462. In contrast, the recess 44 described with reference to FIG. 6A forms a gap in the second surface 42 and the width of the first surface 41 is uniform along the whole extend of the connector ring 40.

The recesses 461, 462 are configured to engage with the respective protrusions 141, 142 of the socket geometry 10 of FIG. 8.

Figure 10:
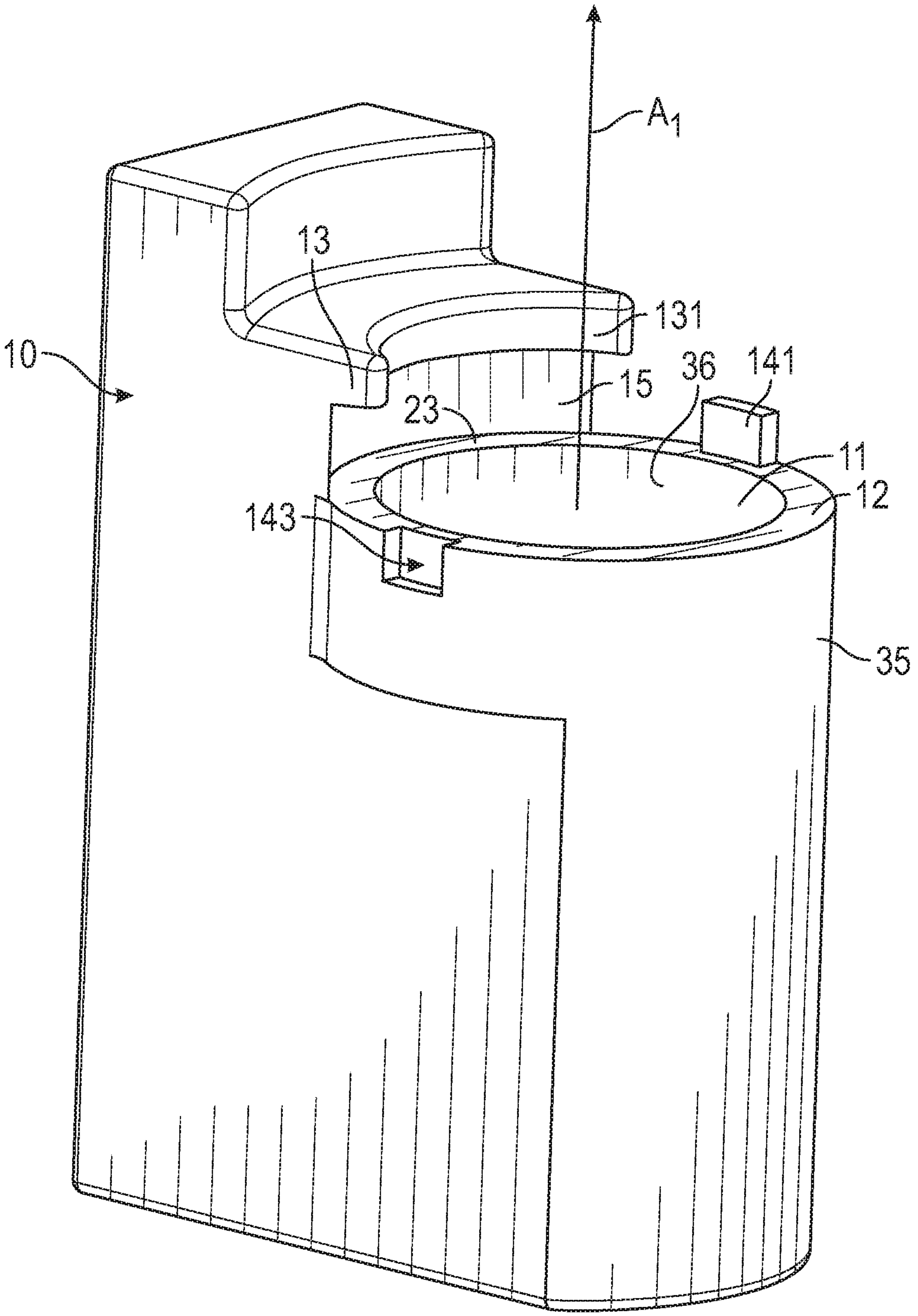
FIG. 10 illustrates a perspective view of a socket geometry of a liquid spray gun according to an embodiment of the present invention.

FIG. 10 shows a perspective view of a socket geometry 10 of a liquid spray gun (not shown) according to another embodiment. In particular, the socket geometry 10 according to FIG. 10 differs from the socket geometry 10 according to FIG. 8 in that one protrusion 141 and one recess 143 are provided on the end surface 12.

The recess 143 and the protrusion 141 are located on the end surface 12 opposite each other. Taken the above-mentioned definition, i.e. the projection of the center of the lug portion 13 onto the end surface 12 of the socket geometry 10 as a reference location 23 on the end surface 12 may be defined as 0°. The angular range starts from 0° and extends in a clockwise direction along the end surface 12. In this case, the protrusion 141 is located on the end surface 12 at 90° and the recess 143 is located on the end surface 12 at 270° according to FIG. 10. That is, the protrusion 141 is located relative to the recess 143 by 180° on the end surface 12.

The recess 143 is shown in FIG. 10 extends on the outer surface 35 of the bore 11. However, the recess 143 may also extend on the internal surface 36 of the bore 11. In addition, the recess 143 may also extend over the whole width of the end surface 12.

Figure 11:
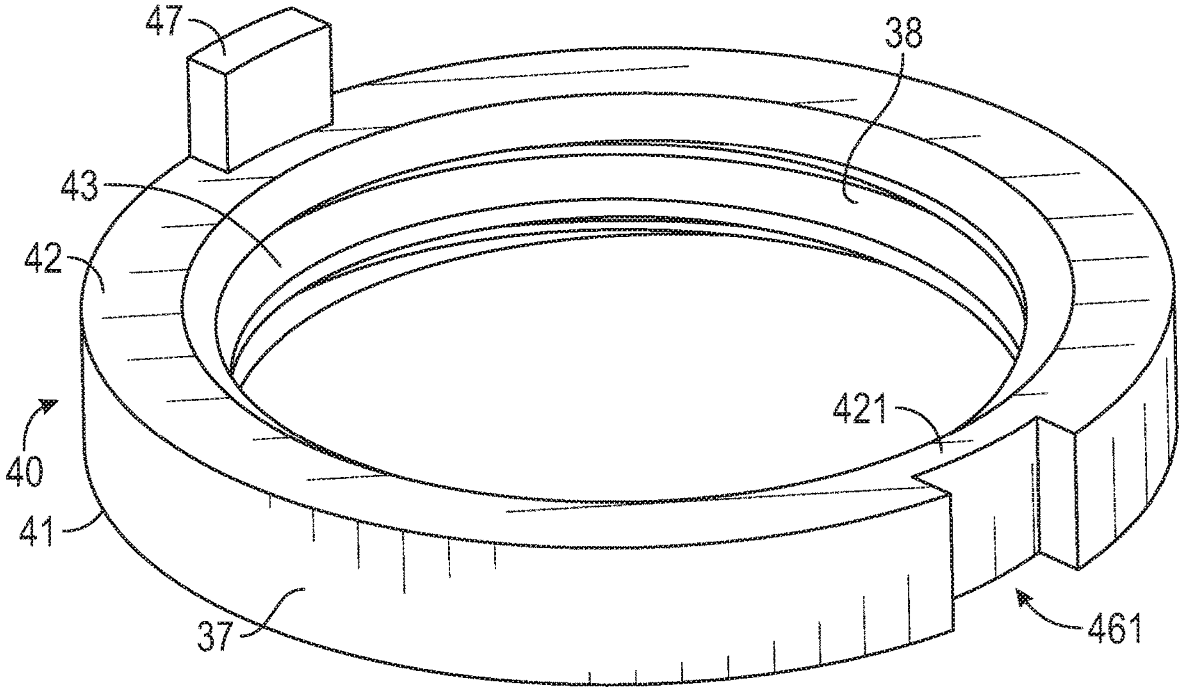
FIG. 11 illustrates a perspective view of a connector ring according an embodiment of the present invention.

FIG. 11 shows a perspective view of a connector ring 40 in accordance with the socket geometry 10 as described with respect to FIG. 10. That is, the connector ring 40 comprises one protrusion 47 and one recess 461 having a bridge portion 421. The recess 461 is configured to engage with the corresponding protrusion 141 of the socket geometry 10 of FIG. 10. The protrusion 47 is configured to engage with the corresponding recess 143 of the socket geometry 10 of FIG. 10.

Therefore, the protrusion 47 extends only partly over the width of the second surface 42. However, if the recess 143 on the socket geometry 10 is provided over the whole width of the end surface 12, the protrusion 47 may also extend over the whole width of the second surface 42. In addition, the location of the protrusion 47 on the second surface 42 may correspond to the location of the recess 143 on the socket geometry 10. That is, if the recess 143 on the socket geometry 10 is formed in the outer surface 35 of the bore 11, as illustrated in FIG. 10, the protrusion 47 may extend from the outer side 37 of the connector ring 40 at least partly over the width of the connector ring 40. Likewise, if the recess 143 on the socket geometry 10 extends from the inner surface 36 of the bore 11, the protrusion 47 may extend from the inner side 38 of the connector ring 40 at least partly over the width of the connector ring 40.

Figure 12:
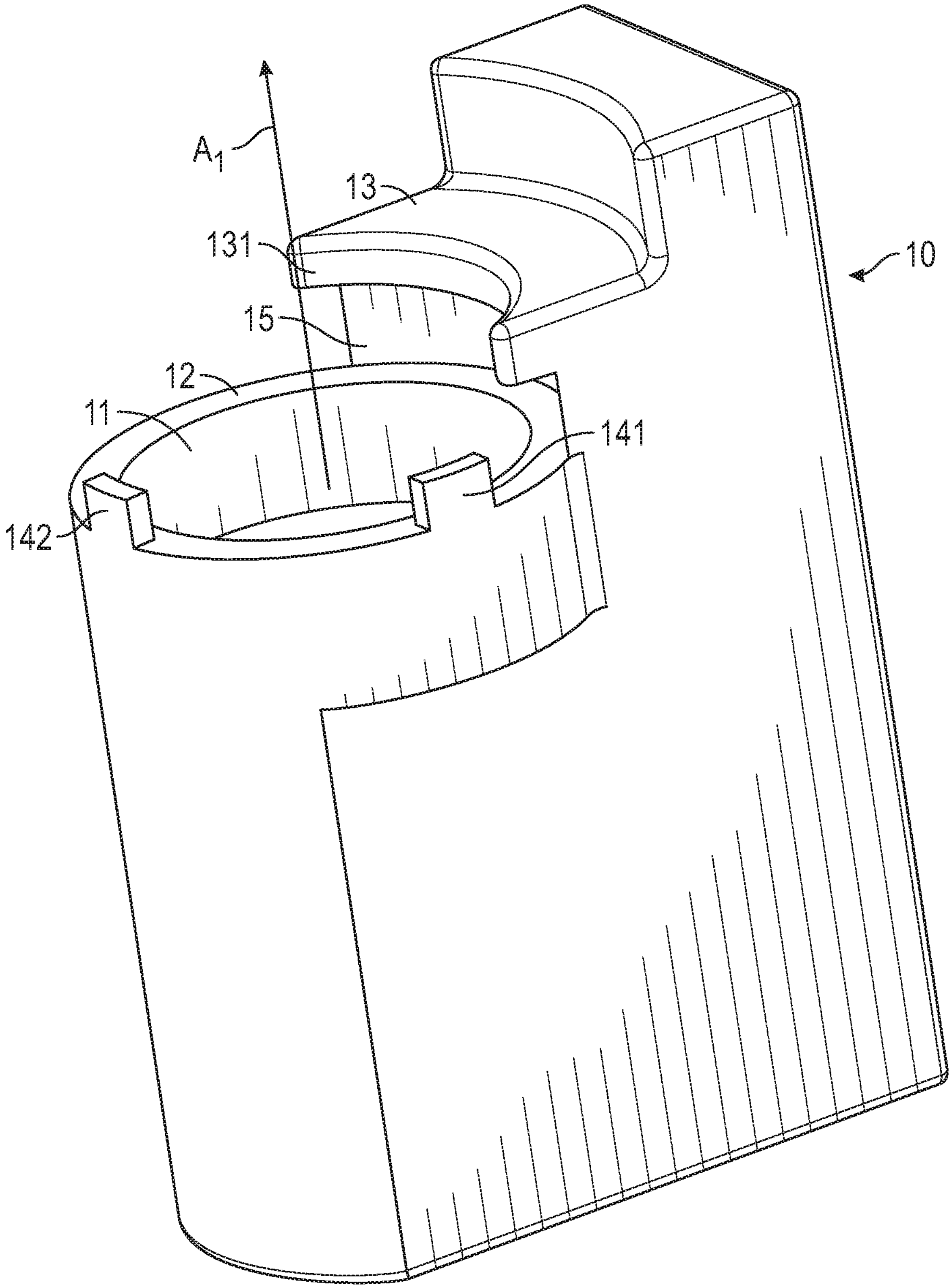
FIG. 12 illustrates a perspective view of a socket geometry of a liquid spray gun according to an embodiment of the present invention.

FIG. 12 shows a perspective view of a socket geometry 10 of a liquid spray gun (not shown) according to another embodiment. In particular, the socket geometry 10 according to FIG. 12 differs from the socket geometry 10 according to FIG. 8 in that the second protrusion 142 is located at a different position on the end surface 12. Whereas, the first protrusion 141 is located at the same position on the end surface 12 as in FIG. 8.

In terms of the above given definition of the angular range along the end surface 12, the first protrusion 141 is located at 90° on the end surface 12 and the second protrusion 142 is located at 180° on the end surface 12. That is, the second protrusion 142 is located 90° further along the end surface 12 than the first protrusion 141.

Figure 13:
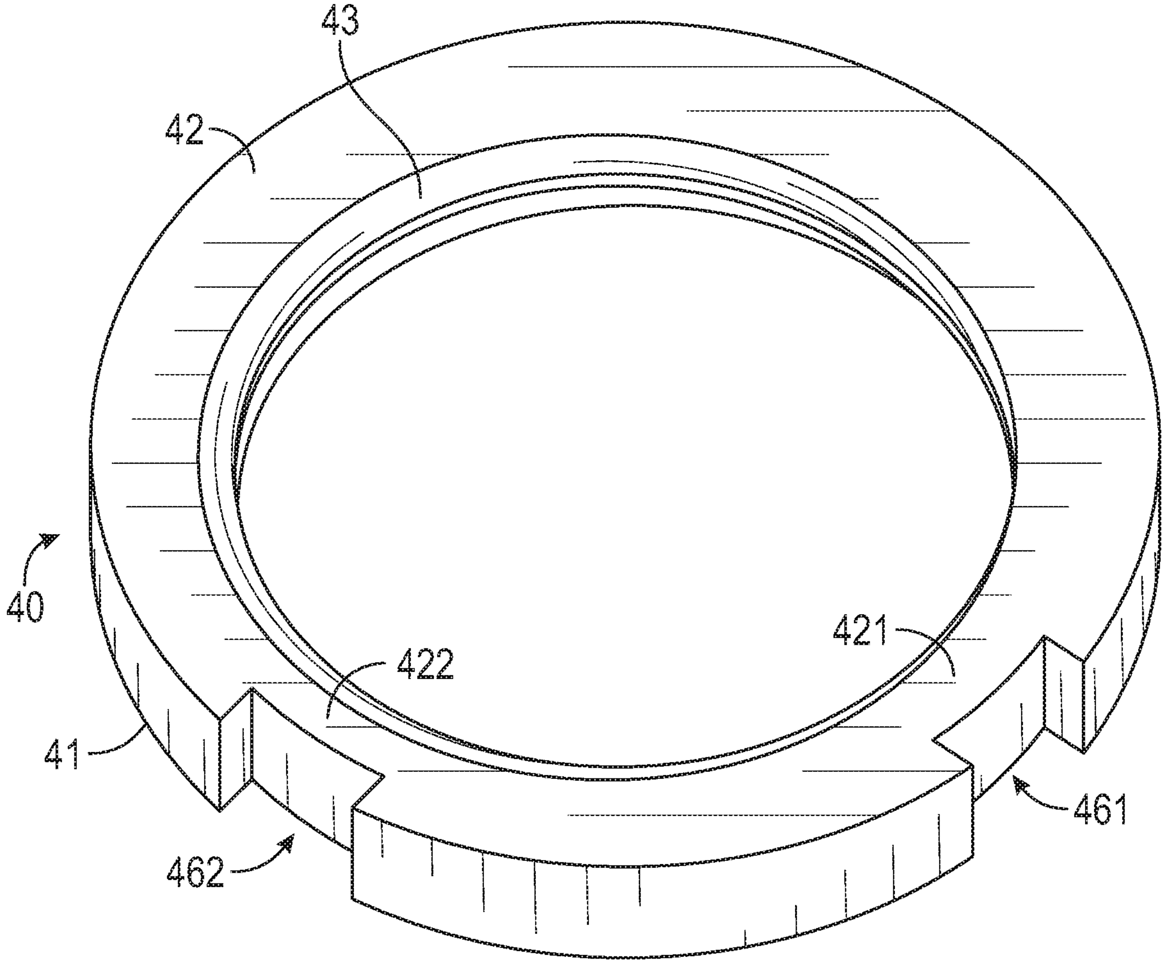
FIG. 13 illustrates a perspective view of a connector ring according an embodiment of the present invention.

FIG. 13 shows a perspective view of a connector ring 40 according to the socket geometry 10 of FIG. 12. That is, the connector ring 40 comprises a first recess 461 and a second recess 462, which basically correspond to the ones shown in FIGS. 9A and 9B. However, the second recess 462 is located at a different position on the connector ring 40. The second recess 462 is located 90° further along the circumference of the connector ring 40 in relation to the first recess 461. Thus, the connector ring 40 fits to the socket geometry 10 of FIG. 12, so that the protrusions 141, 142 can mate with the recesses 461, 462, respectively.

Figure 14A:
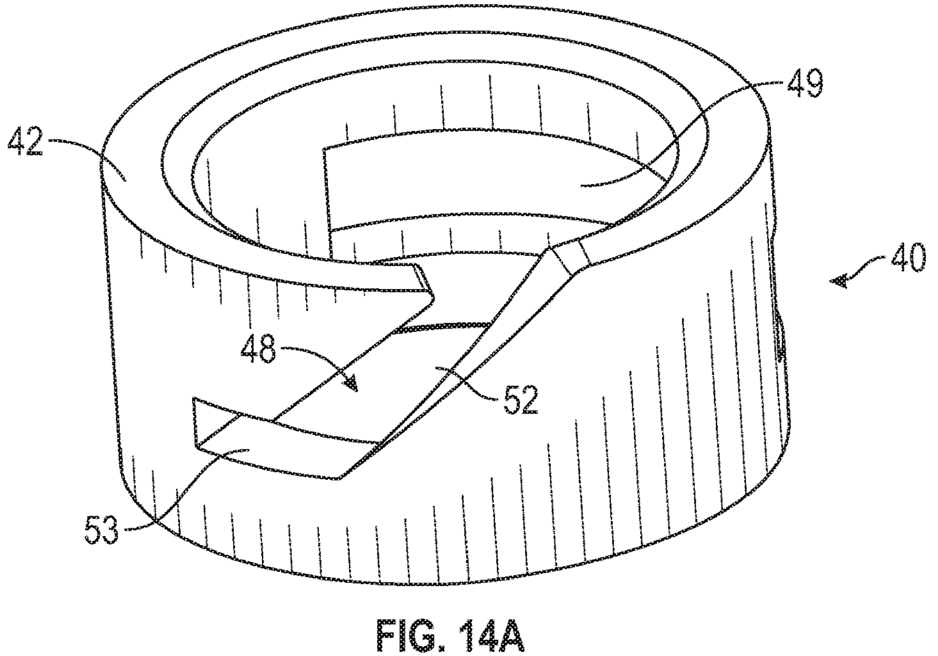
FIG. 14A illustrates a perspective view of a connector ring according an embodiment of the present invention.
Figure 14B:
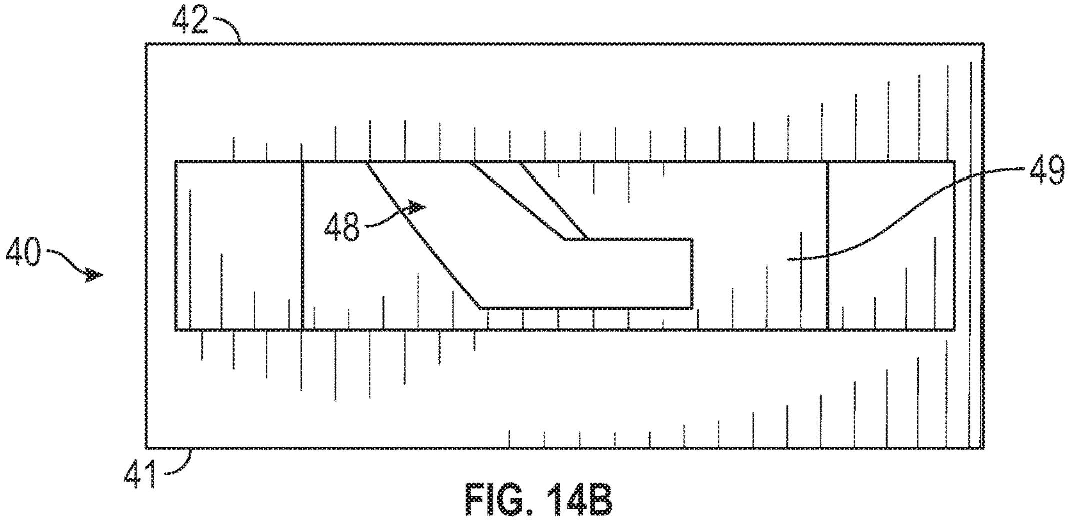
FIG. 14B illustrates a back view of the connector ring of FIG. 14A.
Figure 14C:
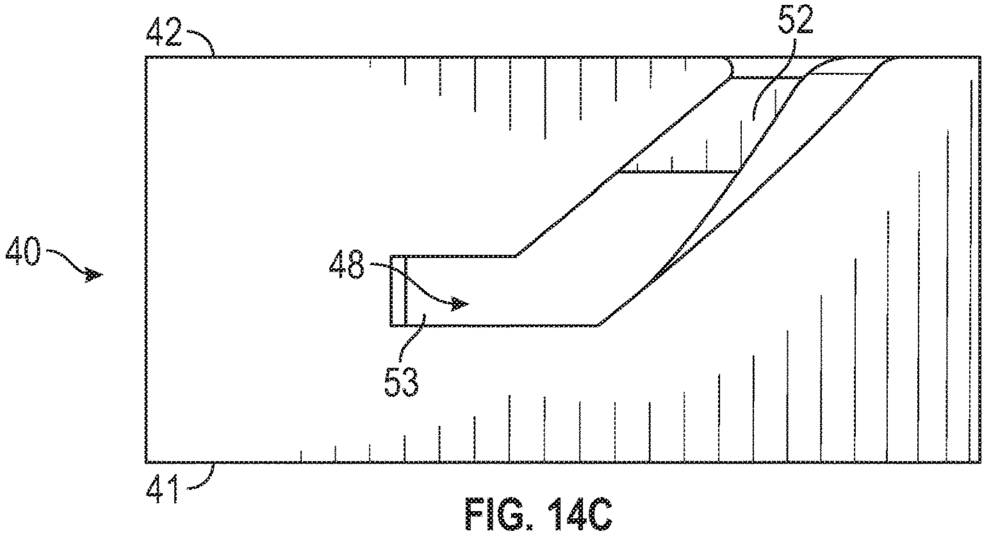
FIG. 14C illustrates a front view of the connector ring of FIG. 14A.

FIGS. 14A-C show different views of an alternative connector ring 40. In contrast to the connector rings 40 described above, the connector ring 40 of FIGS. 14A-C does not comprise a threaded internal surface. Rather, the connector ring 40 of FIGS. 14A-C comprises a bayonet fitting 48 to engage with a corresponding pin of an adapter as further described below.

In particular, the bayonet fitting 48 comprises a first cutout 52 that extends from the second surface 42 a predetermined distance towards the first surface 41 under a predetermined angle. In addition, the bayonet fitting 48 comprises a second cutout 53 that extends a predetermined distance from the first cutout in a direction parallel to the first and second surface 41, 42.

In addition, the connector ring 40 comprises a cutout 49 along the side surface of the connector ring 40. The cutout 49 is configured to receive the lug portion 13 of the socket geometry 10. That is, the cutout 49 has predetermined dimensions that allow the cutout 49 to accommodate the lug portion 13.

The cutout 49 is located opposite the bayonet fitting 48 and at an equal distance from the first and second surface 41, 42.

Figure 15A:
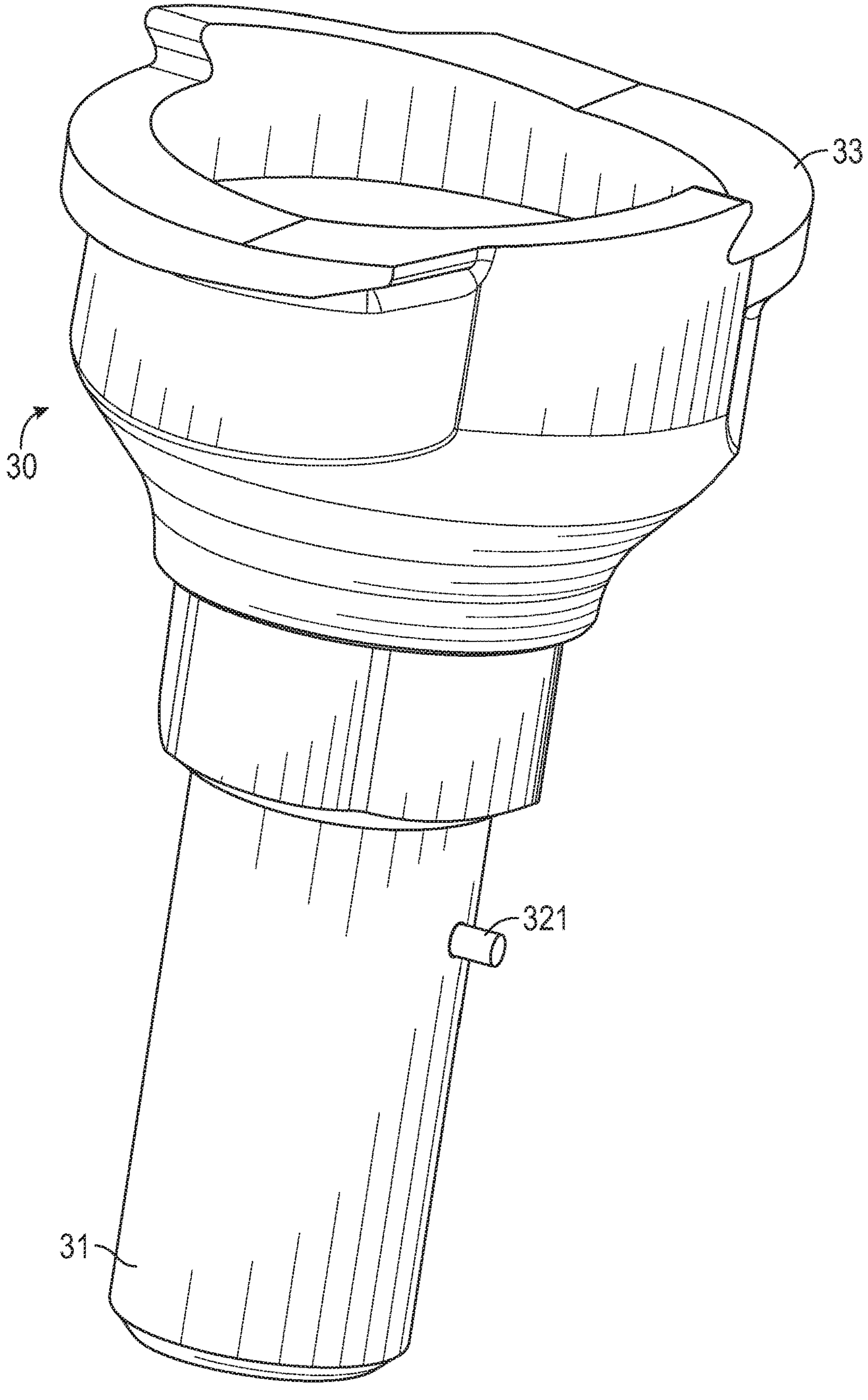
FIG. 15A illustrates a perspective view of an adapter according to an embodiment of the present invention.
Figure 15B:
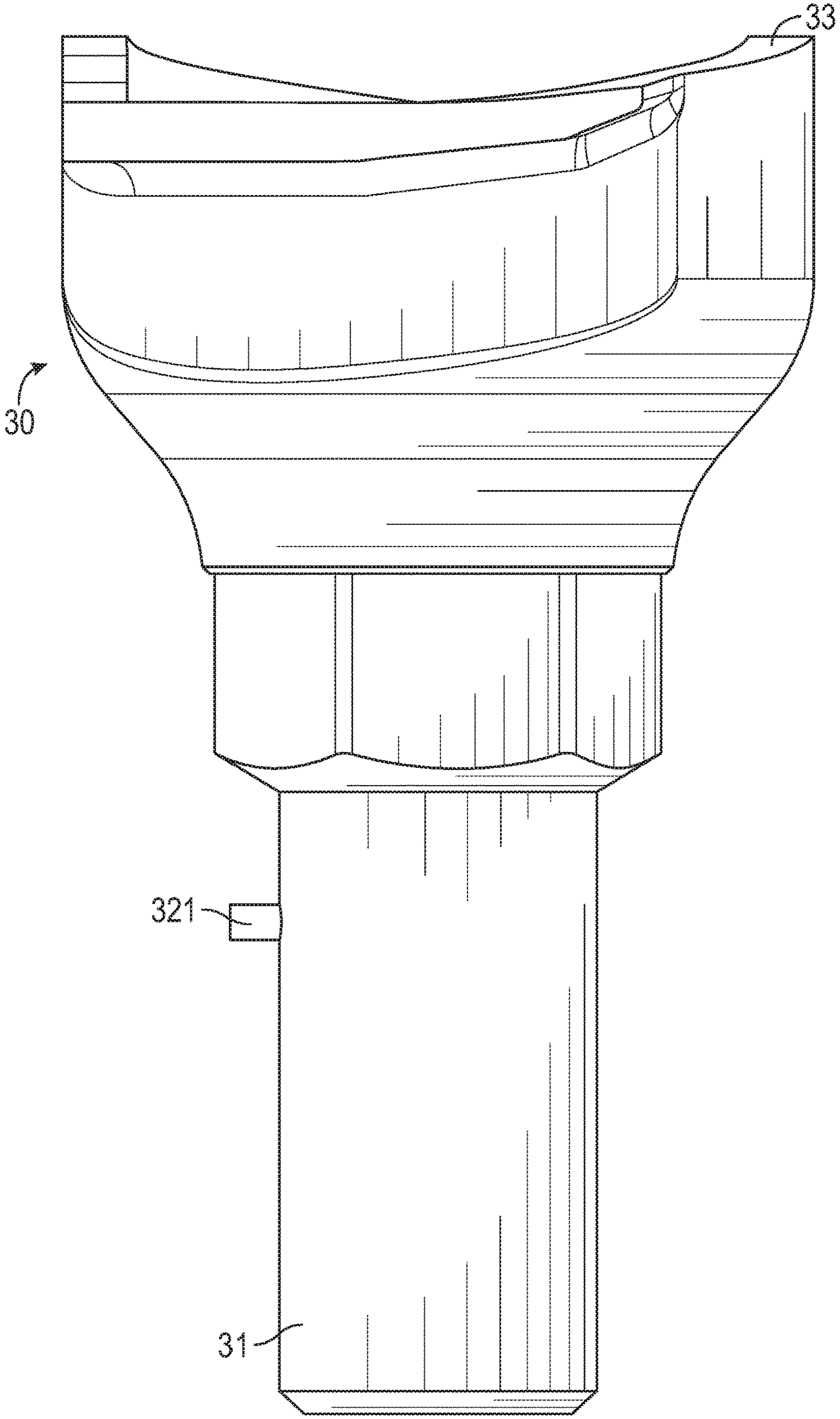
FIG. 15B illustrates a side view of the adapter of FIG. 15A.

FIGS. 15A-B show a respective adapter 30 comprising a pin 321, which can be received by the bayonet fitting 48 of the connector ring 40 of FIGS. 14*a-c* to retain the adapter in the connector ring 40 and therefore the fluid outlet 31 of the adapter 30 in the bore 11 of the socket geometry 10.

The pin 321 is configured to be inserted into the bayonet fitting 48 by placing the pin 321 into the first cutout 52 of the bayonet fitting 48. The pin 321 is thus guided from the first cutout 52 in a rotational and downward motion to the second cutout 53 of the bayonet fitting 48, where a final rotational movement has to be applied to the adapter 30 to place the pin 321 at the end portion of the second cutout 53 and thus retain the adapter 30 in the connector ring 40.

In addition to the bayonet fitting 48, alternative fittings to retain, e.g. an adapter, in a connector ring 40 may be employed with the present invention. For example, the present invention may be used with a connector ring that comprises a friction fit in cooperation with a respective adapter, (provided the connector ring can undergo some degree of axial movement to locate and become secured etc.)

It should be appreciated that any kind of recess described above and below may be used in connection with any of the connector rings 40 described herein. The same is true for different designs of the protrusions, either on the socket geometry 10 or the connector ring 40, described herein. That is, the specific design of a protrusion and recess is not limited to that specific embodiment it is described with. The only requirement should be that the protrusion is configured to engage with a respective recess. Also, different protrusion and/or recess designs may be used within one embodiment.

In addition, the locations of the different protrusions and recesses on the end surface 12 are not limited to a particular location or configuration. That is, one or more protrusion(s) and recess(es) may be located at any location on the end surface 12 and in any relation to one another.

Although the present invention has been described based on exemplary embodiments, this should not in any way restrict the scope of the invention. It will be understood by a person skilled in the art, that various modification to the exemplary embodiments are possible without departing from the scope of the present invention as defined by the claims.

In addition, it is clear for a skilled person that certain features only described with reference to one specific embodiment may be combined with other features of another embodiment. Furthermore, in the claims the word "comprising" does not exclude other elements or steps, and the indefinite article "a" or "an" does not exclude a plurality. A single unit may fulfil the functions of several features recited in the claims. The terms "essentially", "about", "approximately" and the like in connection with an attribute or a value particularly also define exactly the attribute or exactly the value, respectively.

What is claimed is:

1. A liquid spray gun connectable to a fluid reservoir through a fluid outlet, the spray gun comprising a socket geometry arranged for engagement with a co-operating connector for releasable connecting the spray gun with the fluid outlet, wherein the socket geometry comprises a bore having an opening on one end, an end surface surrounding the bore's opening at least partially, and a lug portion spaced apart from the end surface in an axial direction parallel to a central axis of the bore, wherein the lug portion projects towards the central axis of the bore, wherein the lug portion has a lower surface being adapted to engage with the connector and to retain the connector in the axial direction, and wherein the end surface comprises a first keying geometry that is adapted to restrict rotation of the connector in at least one direction;

wherein the connector comprises a connector ring with a second keying geometry.

2. The liquid spray gun of claim 1, wherein the end surface of the socket geometry is planar.

3. The liquid spray gun of claim 1, wherein the first keying geometry comprises at least one protrusion and/or at least one recess.

4. The liquid spray gun of claim 3, wherein the at least one protrusion and/or at least one recess extends in the axial direction from the end surface.

5. The liquid spray gun of claim 1, wherein a radial inner surface of the lug portion surrounding the bore is at least partially curved when viewed along an axial direction parallel to the central axis of the bore.

6. A liquid spraying apparatus comprising the spray gun according to claim 1, wherein the connector comprises:

a first surface adapted to engage with the lower surface of the lug portion to retain the connector in the axial direction, and the second keying geometry that is adapted to engage with the first keying geometry to restrict rotation of the connector in at least one direction.

7. The liquid spraying apparatus of claim 1, wherein the connector ring is a C-shaped connecting ring having a gap along the circumference of the connector ring, and wherein the second keying geometry is defined by the gap of the C-shaped connector ring.

8. The liquid spraying apparatus of claim 1, wherein the second keying geometry comprises at least one recess or at least one protrusion on a second surface of the connector ring facing towards the end surface of the socket geometry.

9. The liquid spraying apparatus of claim 1, wherein the connector ring comprises a threaded internal surface.

10. The liquid spraying apparatus of claim 9, further comprising an adapter with a threaded outer surface to engage with the threaded inner surface of the connector ring.

11. The liquid spraying apparatus of claim 10, wherein the adapter is adapted to be screwed into the connector ring and adapted to abut against the spray gun so that the connector ring is forced against the lower surface of the lug portion as the adapter is screwed into the connector ring so as to provide a fluid-tight connection between the liquid spray gun and the adapter.

12. The liquid spray gun of claim 1, wherein the lug portion and the end surface are connected by a connecting surface, wherein the spacing between the lug portion and the end surface is defined by the extension of the connecting surface in the axial direction from the end surface.

13. The liquid spray gun of claim 12, wherein the lug portion extends from the connecting surface towards the central axis of the bore at least the same length as a width of the end surface.

14. The liquid spray gun of claim 1, wherein the lug portion comprises an upper surface that faces away from the end surface and the lower surface faces towards the end surface.

15. The liquid spray gun of claim 1, wherein the connector comprises a screw wedge geometry that protrudes from an outer surface of the fluid outlet extending partially around the circumference of the fluid outlet.

16. The liquid spray gun of claim 1, wherein the socket geometry comprises a main body and the lug portion extends away from the main body.

17. The liquid spray gun of claim 1, wherein the first keying geometry is integral with the end surface, and the end surface is integral with the bore.

* * * * *